US008494985B1

(12) United States Patent
Keralapura et al.

(10) Patent No.: US 8,494,985 B1
(45) Date of Patent: Jul. 23, 2013

(54) SYSTEM AND METHOD FOR USING NETWORK APPLICATION SIGNATURES BASED ON MODIFIED TERM TRANSITION STATE MACHINE

(75) Inventors: Ram Keralapura, San Jose, CA (US); Alok Tongaonkar, Sunnyvale, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 294 days.

(21) Appl. No.: 13/109,675

(22) Filed: May 17, 2011

(51) Int. Cl.
G06F 15/18 (2006.01)

(52) U.S. Cl.
USPC .......................................................... 706/12

(58) Field of Classification Search
None
See application file for complete search history.

(56) References Cited

U.S. PATENT DOCUMENTS

| | | | | |
|---|---|---|---|---|
| 2012/0079464 | A1* | 3/2012 | De Smet et al. | 717/143 |
| 2012/0144025 | A1* | 6/2012 | Melander et al. | 709/224 |

OTHER PUBLICATIONS

Kumar et al. "Advanced Algorithms for Fast and Scalable Deep Packet Inspection", ANCS, 2006, pp. 11.*
Sun et al. "Hybrid Regular Expression Matching for Deep Packet Inspection on Multi-Core Architecture", ICCCN, 2010, pp. 7.*
Sen et al. "Accurate, Scalable In-Network Identification of P2P Traffic Using Application Signatures", WWW 2004, pp. 512-521.*
Carrasco, Rafael C., et al., "Learning Stochastic Regular Grammars by Means of a State Merging Method", Proceedings of the Second International Colloquium. Sep. 21-23. ICG, Alicante, pp. 139-152, Springer-Verlag.
Rulot, H., et al., "Learning accurate finite-state structural models of words through the ECGI algorithm", International Conference on Acoustics, Speech and Signal Processing, 1989, ICASSP-89., May 23-26, 1989, pp. 643-646, Glasgow, UK.
Thollard, Franck, et al., "Probabilistic DFA Inference using Kullback-Leibler Divergence and Minimality", Proc 17th International Conf on Machine Learning (2000), pp. 975-982, Morgan Kaufmann, San Francisco, CA.
Cui, Weidong, et al., "Discoverer: Automatic Protocol Reverse Engineering from Network Traces", Proceedings of 16th USENIX Security Symposium, pp. 199-212. Boston, MA, Aug. 6-10, 2007.
Park, Byung-Chul, et al., "Towards Automated Application Signature Generation for Traffic Identification", Network Operations and Management Symposium, 2008. NOMS 2008, IEEE Apr. 7-11, 2008, pp. 160-167.
Newsome, James, et al., "Polygraph: Automatically Generating Signatures for Polymorphic Worms", 2005 IEEE Symposium on Security and Privacy, May 8-11, 2005, pp. 226-241.
Rulot, H., et al., "Learning accurate finite-state structural models of words through the ECGI algorithm", International Conference on Acoustics, Speech, . and Signal Processing, 1989, ICASSP-89., May 23-26, 1989, pp. 643-646, Glasgow, UK.

* cited by examiner

Primary Examiner — Jeffrey Gaffin
Assistant Examiner — Li-Wu Chang
(74) Attorney, Agent, or Firm — Fernandez & Associates, LLP

(57) ABSTRACT

A method for profiling network traffic of a network. The method includes identifying a training set having captured payloads corresponding to a set of flows associated with a network application, determining a set of signature terms from the training set, representing a portion of the captured payloads as regular expressions, representing a regular expression as a path in a modified term transition state machine (MTTSM) including states coupled by at least a link that is assigned a signature term, and analyzing, based on the MTTSM, a flow separate from the set of flows and associated with a server in the network to determine the server as executing the network application.

36 Claims, 6 Drawing Sheets

SYSTEM AND METHOD FOR USING NETWORK APPLICATION SIGNATURES BASED ON MODIFIED TERM TRANSITION STATE MACHINE

CROSS REFERENCE TO RELATED APPLICATIONS

This application is related to U.S. patent application Ser. No. 13/039,125 filed Mar. 2, 2011 and entitled "System and Method for Determining Network Application Signatures Using Flow Payloads," which is incorporated herein by reference.

This application is related to U.S. patent application Ser. No. 13/039,180 filed Mar. 2, 2011 and entitled "System and Method for Using Network Application Signatures Based On Term Transition State Machine," which is incorporated herein by reference.

BACKGROUND OF THE INVENTION

1. Field of the Invention

The present invention relates to computers and computer networks. More particularly, the invention relates to profiling Internet traffic flows to identify network applications responsible for the traffic flows.

2. Background of the Related Art

The evolution of the Internet in the last few years has been characterized by dramatic changes to the way users behave, interact and utilize the network. When coupled with the explosion of new applications sitting on the wire and the rising number of political, economic, and legal struggles over appropriate use of network bandwidth, it is easy to understand why now, more than ever, network operators are eager to posses a more precise and broader-in-scope information on which network applications are using their networks. The commercial world answered to this growing demand providing high-speed packet inspection appliances able to process up to 40 Gbps (gigabits per second) of traffic and supporting hundreds of packet content signatures. Still they appear to struggle in keeping up with the exponential rate at which new applications appear in the network. As a result, the attention of the research community has diverted to flow-based behavioral analysis techniques by applying sophisticated data mining algorithms that work on traffic flows (i.e., ignore packet content) to extract and analyze hidden properties of the traffic either in the forms of "social interaction" of hosts engaged in the communication or in the forms of "spatial-temporal analysis" of features such as flow duration, number and size of packets per flow, inter-packet arrival time. Apart from problems such as false positive and false negatives, these techniques are principally aimed at classifying a traffic flow with a broader application class (e.g., "P2P" (peer-to-peer) application class) rather than revealing the specific application (e.g., "P2P-KaZaA" of the many applications in the P2P application class) responsible for the traffic flow.

The demand for bandwidth management tools that optimize network performance and provide quality-of-service guarantees has increased substantially in recent years, in part, due to the phenomenal growth of bandwidth-hungry P2P applications. It is, therefore, not surprising that many network operators are interested in tools to manage traffic such that traffic critical to business or traffic with real-time constraints is given higher priority service on their network. Furthermore, security is becoming a challenge. Networks and institutions of any size are constantly being targeted with more and more sophisticated attacks. Critical for the success of any such tool is its ability to accurately, and in real-time, identify and categorize each network flow by the application responsible for the flow. Identifying network traffic using port numbers and protocol (e.g., layer-four protocols, such as TCP, UDP, etc.) was the norm in the recent past. This approach was successful because many traditional applications (e.g., layer-seven applications, such as HTTP, SMTP, etc.) use port numbers (e.g., port 80, port 25, etc.) assigned by or registered with the Internet Assigned Numbers Authority (IANA). For example, this technique labels all traffic on TCP port 80 to be HTTP traffic, all traffic on TCP port 25 to be SMTP, and so on. This approach is extremely simple to implement and introduces very little overhead on the classifier. The accuracy of this approach, however, has been seriously reduced because of the evolution of applications that do not communicate on standardized ports. Many current generation P2P applications use ephemeral ports, and in some cases, use ports of well-known services such as Web and FTP to make them indistinguishable to the port-based classifier. For example, BitTorrent® (a registered trademark of BitTorrent, Inc., San Francisco, Calif.) can run on TCP port 80 if all the other ports are blocked. In addition, applications can use or abuse random ports for communication. For example, BitTorrent® can communicate on any TCP or UDP network port that is configured by the user. Furthermore, applications can tunnel traffic inside other applications to prevent detection and/or for ease of implementation. For example, BitTorrent® can send all its data inside a HTTP session. These strategies at the application-level have essentially made port number based traffic classification inaccurate and hence ineffective.

To overcome these issues with port-based approach, techniques that rely on application payload have been developed. Typically, a payload content based signature is developed for a given application by reverse engineering the application/protocol. These signatures are agnostic to the application port usage and are usually accurate (i.e., low false positive and false negative rates). However, this approach faces the problem of scalability. In other words, keeping up with the number of applications that come up everyday is impractical due to the laborious manual reverse engineering process. For example, several hundred new P2P and gaming protocols have been introduced over the last several years. Reverse engineering all these applications in a timely manner requires a huge manual effort. In addition, reverse engineering these applications becomes increasingly difficult when applications use encryption to avoid detection. As a consequence, keeping a comprehensive and up-to-date list of application signatures is infeasible.

As is known to those skilled in the art, the web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts. In vast majority of scenarios, information about servers such as the IP-address is publicly available for user to access. In peer-to-peer based communication, in which all endpoints can act both as clients or servers, the association between an end point and the P2P application becomes publicly visible. Even in the classical client-server communication scenario, information about clients such as website user access logs, forums, proxy logs, etc. also stay publicly available. Given that many forms of communication and various endpoint behaviors do get captured and archived, enormous amount of information valuable for profiling or characterizing endpoint behavior at a global scale is publicly available but has not been systematically utilized for such purpose.

SUMMARY

Generally, embodiments of the invention provide a system and method to develop accurate payload content based signatures without manual intervention for individual application (or application layer protocols) such that they can be used for real-time classification of flows. The architecture described herein decouples the real-time traffic classifier from the offline signature generation algorithms executed in an offline training phase. All the flows that are not labeled by the real-time classifier are grouped together as a flow-set based on a pre-determined criterion (e.g., common (port number, transport protocol) pair shared by each flow of the flow-set) and sent to the signature generation module, which uses offline signature generation algorithms during an offline training phase with no real-time performance constraint for extracting application signatures.

In one or more embodiments of the invention, the application signature is based on both the longest common substrings (referred to as signature terms) and the ordering of these signature terms in the flow payload. The ordered signature terms in multiple flows within a training set is represented as a state machine where the total number of states is minimized while ensuring that incoming flows can be identified in a real-time manner using the state machine.

In general, in one aspect, the present invention relates to a method for profiling network traffic of a network. The method includes (i) identifying, using a processor of a computer system and based on a first pre-determined criterion, a training set from a plurality of flows obtained from the network traffic, wherein the training set is associated with a network application and comprises a plurality of captured payloads corresponding to the plurality of flows, (ii) determining, using the processor and based on a first pre-determined algorithm, a set of signature terms from the training set, wherein the set of signature terms are selected from a plurality of substrings extracted from the plurality of captured payloads, (iii) representing a portion of the plurality of captured payloads as a plurality of regular expressions, each comprising a first sequence of one or more signature terms based on the set of signature terms, (iv) generating a modified term transition state machine (MTTSM), comprising a plurality of states coupled by a plurality of links to form a plurality of paths, by (a) representing a first regular expression of the plurality of regular expressions by a first path, of the plurality of paths, comprising a first state and a second state, of the plurality of states, linked by a first link, of the plurality of links, that is assigned a first signature term in the first regular expression to represent a first state transition associated with the first signature term and (b) representing a second regular expression of the plurality of regular expressions by a second path, of the plurality of paths, comprising the first state and a third state, of the plurality of states, linked by a second link, of the plurality of links, that is assigned a second signature term in the second regular expression to represent a second state transition associated with the second signature term, and (v) analyzing, using the processor and based on the MTTSM, a flow separate from the plurality of flows and associated with a server in the network, comprising (a) extracting, from the flow and based on the set of signature terms, a second sequence of signature terms, (b) determining the first signature term and the second signature term as contained in the second sequence of signature terms, (c) comparing a first position and a second position of the first signature term and the second signature term, respectively, in the second sequence of signature terms to generate a comparison result, and (d) traversing, in response to the comparison result indicating that the first position is ahead of the second position in the second sequence of signature terms, the first link to generate an analysis result, and (vi) determining, based on the analysis result, the server as executing the network application.

In general, in one aspect, the present invention relates to a system for profiling network traffic of a network. The system includes (i) a data collector configured to obtain, from the network traffic, a plurality of flows, (ii) a statistical analyzer configured to identify, from the plurality of flows, a training set comprising a plurality of captured payloads corresponding to the plurality of flows, (iii) a profiler configured to identify the training set as associated with a network application, (iv) a signature generator configured to (a) determine, based on a first pre-determined algorithm, a set of signature terms from the training set, wherein the set of signature terms are selected from a plurality of substrings extracted from the plurality of captured payloads, (b) generate a modified term transition state machine (MTTSM), comprising a plurality of states coupled by a plurality of links to form a plurality of paths, by representing a first regular expression of the plurality of regular expressions by a first path, of the plurality of paths, comprising a first state and a second state, of the plurality of states, linked by a first link, of the plurality of links, that is assigned a first signature term in the first regular expression to represent a first state transition associated with the first signature term and representing a second regular expression of the plurality of regular expressions by a second path, of the plurality of paths, comprising the first state and a third state, of the plurality of states, linked by a second link, of the plurality of links, that is assigned a second signature term in the second regular expression to represent a second state transition associated with the second signature term, (v) a processor and memory storing instructions when executed by the processor comprising functionalities to (a) analyze, based on the MTTSM, a flow separate from the plurality of flows and associated with a server in the network, comprising (x) extracting, from the flow and based on the set of signature terms, a second sequence of signature terms, (y) determining the first signature term and the second signature term as contained in the second sequence of signature terms, (z) comparing a first position and a second position of the first signature term and the second signature term, respectively, in the second sequence of signature terms to generate a comparison result, and (w) traversing, in response to the comparison result indicating that the first position is ahead of the second position in the second sequence of signature terms, the first link to generate an analysis result, and (b) determine, based on the analysis result, the server as executing the network application, and (vi) a repository configured to store the set of signature terms and the MTTSM.

In general, in one aspect, the present invention relates to a computer readable medium storing instructions, when executed by the computer to profile network traffic of a network, the instructions include functionality for (i) identifying, based on a first pre-determined criterion, a training set from a plurality of flows obtained from the network traffic, wherein the training set is associated with a network application and comprises a plurality of captured payloads corresponding to the plurality of flows, (ii) determining, based on a first pre-determined algorithm, a set of signature terms from the training set, wherein the set of signature terms are selected from a plurality of substrings extracted from the plurality of captured payloads, (iii) representing a portion of the plurality of captured payloads as a plurality of regular expressions, each comprising a first sequence of one or more signature terms based on the set of signature terms, (iv) generating a modified term transition state machine (MTTSM), comprising a plurality of states coupled by a plurality of links to form a plurality of paths, by (a) representing a first regular expression of the plurality of regular expressions by a first path, of the plurality of paths, comprising a first state and a second state, of the plurality of states, linked by a first link, of the plurality of links, that is assigned a first signature term in the first regular expression to represent a first state transition associated with the first signature term and (b) representing a second regular expression of the plurality of regular expressions by a second path, of the plurality of paths, comprising the first state and a third state, of the plurality of states, linked by a second link, of the plurality of links, that is assigned a second signature term in the second regular expression to represent a second state transition associated with the second signature term, (v) analyzing, based on the MTTSM, a flow separate from the plurality of flows and associated with a server in the network, comprising (a) extracting, from the flow and based on the set of signature terms, a second sequence of signature terms, (b) determining the first signature term and the second signature term as contained in the second sequence of signature terms, (c) comparing a first position and a second position of the first signature term and the second signature term, respectively, in the second sequence of signature terms to generate a comparison result, and (d) traversing, in response to the comparison result indicating that the first position is ahead of the second position in the second sequence of signature terms, the first link to generate an analysis result, and (vi) determining, based on the analysis result, the server as executing the network application.

Other aspects and advantages of the invention will be apparent from the following description and the appended claims.

DETAILED DESCRIPTION

Figure 1:
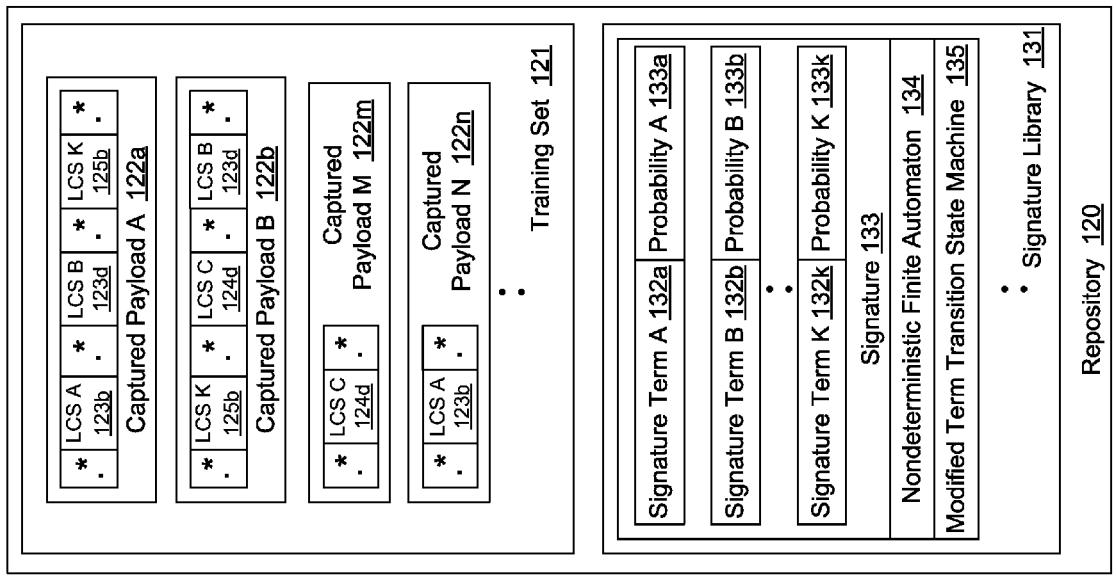
FIG. 1 shows a system block diagram according to aspects of the invention.
Figure 1:
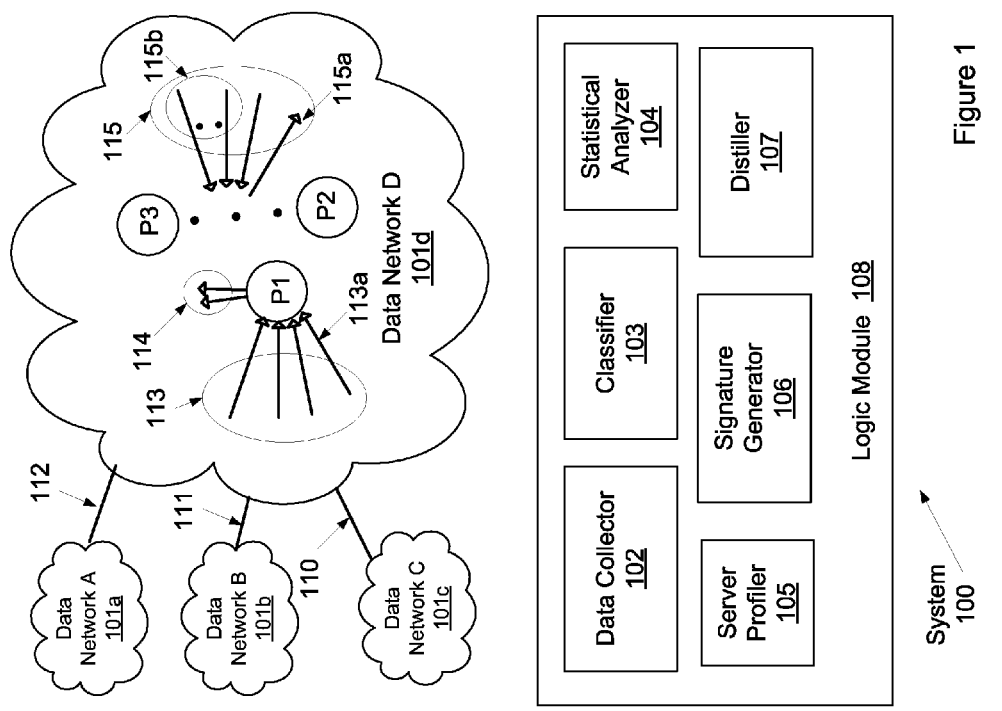

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow.

Throughout this disclosure, the terms "traffic flow", "flow", "traffic stream" and "stream" are used interchangeably and may refer to a complete flow or any portion thereof depending on the context unless explicitly stated otherwise. The term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc. The term "signature" or "packet content signature" refers to an application layer packet content based signature. The terms "signature term" and "term" may be used interchangeably unless explicitly specified otherwise. The term "application" or "network application" refers to an application associated with or based on top of an application layer of a computer network. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

In one or more embodiments of the invention, when full payload packets of input flows are received, a real-time classifier first reconstructs flows and then makes an attempt to label these flows using any existing packet content based signatures. If the classifier successfully labels a flow, then the result is recorded in a database. The classification process for the flow ends. However, if the classifier cannot label the flow, then the flow is sent to a packet content signature generation process. Also, the classifier sends the server IP-address used in the flow to a server profiler. The main task of the server profiler is to find the application/protocol associated with the IP-address. Based on the flow(s) from the classifier and application/protocol name from the server profiler, a statistical analyzer first forms a cohesive flow-set by grouping the flows received from the classifier that share same characteristics (e.g., common (port number, transport protocol) pair), and a signature generator subsequently extracts a set of signature terms to form a signature for the flow-set. In one or more embodiments, the signature generator is aware of only one flow-set being processed and is unaware of the existence of other flow-sets. In such embodiments, the signature generator does not have a global view of all existing signatures and flow-sets. Instead, a distiller receives any new signature generated by the signature generator and examines it along with all the other signatures that already exist in a signature library to check for conflicts and determine a quality metric for each of the extracted signatures based on a global view of all the existing signatures.

Based on the architecture described above and the reason described below, a false-negative (a flow failed to be labeled even though a signature exists in the signature library for the application associated with the flow) may be more tolerable than a false-positive (a flow that are misclassified). Specifically, the signatures for applications are generated to populate the signature library incrementally as flows generated by these applications are analyzed. Initially, there are no signatures in the signature library. When the first set of application flows are analyzed, a new signature for a particular application is generated and accordingly the signature library has one signature for the particular application. Henceforth all the flows that belong to the application (i.e., generated to execute the application) are classified and thus do not enter the offline training phase. Now, if the signature is not very accurate, then several flows that do not belong to the application may get misclassified as belonging to the application. These misclassified flows (i.e. false-positives) will never be available for subsequent training (i.e., signature generation) thus false-positive errors of the real-time classifier continue to occur. In contrast, those flows that are not classified due to false negatives are sent to the signature generator and used to generate another signature later on when sufficient number of flows is grouped into a cohesive flow-set. Accordingly, false-negative errors of the real-time classifier may be reduced as time goes on.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes data networks A through D (101a, 101b, 101c, 101d), a logic module (108), and a repository (120). Each of these networks A through D may be a portion of a larger network and are shown to be coupled via links (110, 111, 112). The network D (101d) includes hosts (P1, P2, P3, etc.). As shown, host (P1) is a source or destination associated with flows (113, 114) while hosts (P2, P3, etc.) are source(s) or destination(s) associated with flows (115). Accordingly, the flows (113, 114) are referred to as attached to the server (P1) while the flows (115) are referred to as attached to the servers (P2, P3, etc.). In particular, the flows (113) include a particular flow (113a) while the flows (115) include another particular flow (115a). Further, a portion of the flows (115) is a set of unidirectional flows (115b). Each flow (e.g., flow (113a), flow (115a)) in these flows (113, 114, 115) includes full payload packets. In one or more embodiments of the invention, each flow in these flows (113, 114, 115) relates to an application executing on the attached server at a particular time. For example, flows (113) may include HTTP GET commands sent from various clients to the server (P1) while the flows (114) may include HTTP TRACE commands sent from the server (P1) to various clients. Accordingly, the flows (113, 114) are referred to as "associated with an application executing on server (P1)", "corresponding to an application executing on server (P1), "generated by an application executing on server (P1)", "generated to execute an application on server (P1)", or "generated for executing an application on server (P1)" in an interchangeable manner depending on the context unless explicitly stated otherwise.

As shown in FIG. 1, the logic module (108) includes a data collector (102), a classifier (103), a statistical analyzer (104), a server profiler (105), a signature generator (106), and a distiller (107). The data collector (102), the classifier (103), and the statistical analyzer (104) may be referred to as a stream processor or a flow processor.

Further as shown in FIG. 1, the repository (120) includes a training set (121) and a signature library (131). The training set (121) is shown to include a number of captured payloads A through N (122a, 122b, 122n, etc.) each including a sequence of packet payloads captured from one flow (e.g., a flow in the flows (115)). In one or more embodiments, such sequence of packet payloads is captured from a portion (e.g., up to the first 50 packets or the first 1000 payload bytes) of such one flow. In one or more embodiments, a packet payload in such sequence of packet payloads is a full packet payload, or a portion thereof, in one packet of the flow. In particular, the sequence of packet payloads included in a captured payload (e.g., captured payload A (122a)) consists of packet payloads extracted from multiple packets and concatenated according to an order based on sequence information contained in corresponding packet headers. In one or more embodiments, packet headers (not shown), or information derived therefrom, may also be included in the training set (121) where each packet header, or information derived therefrom, is linked to a corresponding captured payload or a packet payload contained therein. In one or more embodiments, the training set (121) is extracted from a collected flow-set (not shown) and separately stored in the repository (120). In one or more embodiments, the training set (121) is embedded in a collected flow-set (not shown) that is stored in the repository (120). In such embodiments, the captured payloads (e.g., captured payload A (122a)) are extracted from the flow-set as needed during processing for signature extraction. In one or more embodiments, a captured payload (e.g., captured payload A (122a)) is extracted in real time as a flow is obtained. In such embodiments, such captured payload is stored in the repository (120) to form the training set (121) without storing a separate flow-set in the repository (120).

The signature library (131) is shown to include one or more signatures (e.g., signature (133)) each associated with a non-deterministic finite automaton (NFA) (e.g., NFA (134)) and a modified term transition state machine (MTTSM) (e.g., MTTSM (135)) representing the associated signature. As shown, the signature (133) includes signature terms A through K (132a, 132b, 123k, etc.) corresponding to probabilities A through K (133a, 133b, 133k, etc.). Further, the signature (133) is represented by the NFA (134) and/or MTTSM (135). In one or more embodiments, the NFA (134) is generated from the signature (133) prior to the MTTSM (135) is converted from the NFA (134). In one or more embodiments, the MTTSM (135) is generated directly from the signature (133). In such embodiments, the NFA (134) may be omitted from the signature library (131). In one or more embodiments, the signature library (131) may be implemented as a database, a file, a linked list, or any other suitable data structures.

In one or more embodiments, the data collector (102) is configured to obtain, from the network traffic (e.g., including all of flows (113), flows (114), flows (115), etc.), a flow-set (i.e., a set of flows, such as one or flows (113), flows (114), flows (115), flows (115b), etc.) associated with a number of servers (e.g., server (P1), server (P2), server (P3), etc.) executing one or more network applications in the network. Specifically, the data collector (102) may observe and collect, for example from links (110, 111, 112), information regarding network traffic when available and to filter and organize the collected traffic data regarding duplicate records or out-of-order records. Accordingly, the collected traffic data is reconstructed to represent data packets of a flow in an appropriated order (e.g., based on sequence information in the headers) consistent with the Internet transaction performed by the flow. Throughout this disclosure, "obtaining a flow" may refer to obtaining a complete flow or any portion thereof depending on the context unless explicitly stated otherwise.

In one or more embodiments, the output of the data collector (102) includes a captured payload (e.g., captured payload A (122a), etc.) of a flow (e.g., flow (113a), flow (115a)) and is provided to the classifier (103) configured to either identify an application (e.g., HTTP) (e.g., associated with the flow (113a)) or to pass information (e.g., a captured payload or a reference thereof) of a not-yet-identifiable flow (e.g., flow (115a)) to the statistical analyzer (104). In particular, the captured payloads (e.g., captured payload A (122a), etc.), when included in the training set (121), are already processed by the data collector (102) regarding duplicate records or out-of-order records based on corresponding packet headers.

In one or more embodiments, the classifier (103) is configured to classify the flows collected and processed by the data collector (102) in real time using a list of known signatures (e.g., signature (133)) in the signature library (131), which are previously extracted/generated by the signature generator (106). For example, concurrently with a portion of a flow being generated in response to the attached server executing a network application to complete a task (e.g., by performing an Internet transaction), data packets in the portion of the flow are processed by the classifier (103) in an expedient manner to identify the particular network application prior to the task or the flow being completed by the attached server. Every flow received from data collector (102) for which a signature is available is classified (i.e., associated with an application) and promptly reported to the end-user (not shown). Accordingly, an alert may be generated in time to block a malicious flow aimed at performing a malicious Internet transaction or other malicious task.

In one or more embodiments, when an unknown flow (i.e., flow (115a) for which a signature is not yet available in the signature library (131)) is observed, the classifier (103) forwards the unknown flow, or related information thereof, to the statistical analyzer (104) to be added to a training set (121) for generating a new signature subsequently. In one or more embodiments, the flow (115a), or related information thereof, may be sent from the data collector (102) to the statistical analyzer (104) directly bypassing the classifier (103), for example when there is no signature in the signature library (131) initially.

In one or more embodiments, the statistical analyzer (104) is configured to identify the training set (121) from a set of flows (i.e., a flow-set, such as the set of unidirectional flows (115b)), or captured payloads thereof, based on a pre-determined criterion. The training set may be identified using many different schemes such that the training set is a statistically representative subset of flows associated with a particular network application. In one or more embodiments, the training set (121) includes the captured payloads and other relevant portion of the statistically representative subset of flows. An example method of identifying the training set from a cohesive flow-set is described in related U.S. patent application Ser. No. 13/039,125 filed Mar. 2, 2011 and entitled "System and Method for Determining Network Application Signatures Using Flow Payloads," which is incorporated herein by reference.

In one or more embodiments, each server contributing to the training set (121) is tagged with a network application. For example, such network application may be tagged based on the Internet Assigned Numbers Authority (IANA) standard. Another example method for tagging a server with a network application is described in U.S. patent application Ser. No. 12/104,723 filed Apr. 17, 2008 and entitled "System and Method for Internet Endpoint Profiling," which is incorporated herein by reference. In one or more embodiments, the server profiler (105) tallies the number of servers executing each of the tagged network applications to identify the network application executing on a maximum number of servers in the tallied result as the particular network application associated with the training set. In one or more embodiments, flows associated with different network applications than the particular network application identified by the server profiler (105) are explicitly eliminated from the training set. In one or more embodiments, flows associated with different network applications than the particular network application identified by the server profiler (105) remains in the training set with their contribution to signature generation implicitly suppressed based on the signature generation algorithm.

In one or more embodiments, the signature generator (106) is configured to identify signature term candidates (e.g., LCS A (123b), LCS B (123d), LCS K (125b), LCS C (124d)) from the captured payloads (e.g., captured payload A (122a), captured payload B (122b), captured payload M (122m), captured payload N (122n)) in the training set (121) based on a pre-determined algorithm. The signature term candidates may be identified from captured payloads using many different schemes.

In one or more embodiments, a captured payload (e.g., captured payload A (122a)) in the training set (121) is considered as a string (e.g., of data bytes or characters from multiple packets corresponding to the captured payload). The longest common substring is the longest substring that is common to (i.e., exists simultaneously in) two or more such strings. For example, the longest common substrings of the strings "ABAB", "BABA" and "ABBA" are the strings "AB" and "BA" of length 2. Other common substrings are "A" and "B", which are not longest common substring as they are shorter in length. An example method of identifying longest common substrings as the signature term candidates from a collection of captured payloads is described in related U.S. patent application Ser. No. 13/039,125 filed Mar. 2, 2011 and entitled "System and Method for Determining Network Application Signatures Using Flow Payloads," which is incorporated herein by reference. In other examples, the signature term candidates may be identified from captured payloads using other different schemes.

As shown in FIG. 1, the captured payload A (122a) includes three signature term candidates LCS A (123b), LCS B (123d), and LCS K (125b) interposed in wildcard substrings (.*). The captured payload B (122b) includes three signature term candidates LCS K (125b), LCS C (124d), and LCS B (123d) interposed in wildcard substrings (.*). The captured payload M (122m) includes a substring LCS C (124d) interposed in wildcard substrings (.*). The captured payload N (122n) includes a substring LCS A (123b) interposed in wildcard substrings (.*). As is known to those skilled in the art, a wildcard substring (.*) contains non-pre-determined data bytes (or characters) that substitutes for other data bytes (or characters) in a regular expression, which is an expression known to those skilled in the art that describes a set of substrings in a string as an ordered sequence. For example, the signature term candidates LCS A (123b), LCS B (123d), LCS K (125b), and LCS C (124d) may be longest common substrings of the captured payloads in the training set (121) while each of the LCS A (123b), LCS B (123d), and LCS K (125b) is a substring embedded in a captured payload represented by a regular expression as described below.

In one or more embodiments, the signature generator (106) is configured to qualify the identified signature term candidates into signature terms. In one or more embodiments, an identified signature term candidates is determined to be a signature term if its length exceeds a pre-determined length threshold and its probability of occurrence exceeds a pre-determined noise threshold. In such embodiments, the signature generator (106) is configured to calculate a probability of occurrence of each identified signature term candidates by analyzing all captured payloads in the entire training set (121) and tallying the total number that each identified signature term candidate occurs in the entire training set (121). For example, the probability of occurrence may be calculated as a non-normalized occurrence count (e.g., 100 times) or as a normalized percentage (e.g., 10% of total 1000 times) of total count of all identified signature term candidate in the training set (121).

For example, if the pre-determined length threshold is four bytes and the pre-determined noise threshold is 100 times, an identified signature term candidates has to be four bytes or longer and occurs more than 100 times in the training set (121) to be determined as a signature term. As shown, the LCS A (123b), LCS B (123d), and LCS K (125b) are determined as meeting this requirement and are stored in the signature library (131) as the signature term A (132a), signature term B (132b), and signature term K (132k), respectively. In addition, the number of times each of the LCS A (123b), LCS B (123d), and LCS K (125b) occurs in the training set (121) is also stored in the signature library (131), associated with the respective signature term, as the probability A (133a), probability B (133b), and probability K (133k), respectively. In contrast, the LCS C (124d) is determined as failing to meet the aforementioned requirement and not stored in the signature library (131). For example, LCS C (124d) may either be less than four bytes long or occurs less than the example noise threshold of 100 times in the training set (121).

In one or more embodiments, determining an identified signature term candidate to be a signature term requires additional qualification based on a pre-determined criterion. In one or more embodiments, an identified signature term may be disqualified and removed from the signature library (121) via further examination (referred to as a cleansing process) based on the pre-determined criterion. For example, such pre-determined criterion may disqualify the identified signature term candidate or identified signature term remove a disqualified signature term if it has a length less than a pre-determined threshold, if it is a day of a week, a month, a year, or a world-wide-web domain, or if it contains less than two alphabetic characters. In another example, such pre-determined criterion may split the identified signature term candidate or identified signature term where in contains a pre-determined control character.

More details of these qualification requirements as well as additional qualification requirements based on signature term popularity threshold, signature terms count threshold, and mutually exclusive signature term grouping are described in reference to FIG. 2a below.

All signatures terms determined based on the training set (121) are collectively referred to as the signature (133), which is considered to be associated with the particular network application of the training set (121). Although not specifically shown in FIG. 1, more than one training set may be identified as statistically representative subset of flows associated with the particular network application. Accordingly, more than one signature may be determined as associated with the particular network application and stored in the signature library (131).

In one or more embodiments, the signatures stored in each signature in the signature library (131) may be qualified using the distiller (107). For example, the distiller (107) may be configured to perform various tasks described below.

First, the distiller (107) expires signatures characterized by long inactivity time, i.e., the last time a flow was matched those signatures by the classifier (103) exceeded a pre-specified internal threshold. This task is referred to as signature-expiration process.

Second, for the remainder signatures in the signature library (131), the distiller (107) provides an indicator that reflects the overall quality of the signatures present in the signature library (131) such as to alert the situations in which distinct signatures may look similar. This second task is referred to as signature quality estimation process.

Third, distiller (107) decides whether a new signature can be appropriately added to the signature library (131) without compromising the quality of the current signatures. A set of signatures is said to be of good quality if the signatures constituting the set are dissimilar from each other based on a pre-determined similarity measure. This task is referred to as signature-specific quality estimation process.

Fourth, the distiller (107) is responsible to optimize the signature library (131) by deciding which signatures can be consolidated, i.e., appending more than one signature to the same network application. This task is referred to as signature consolidation process.

In one or more embodiments, subsequent to compiling and/or qualifying the signature library (131), the signature generator (106) is further configured to analyze each of the captured payloads in the training set (121) to identify any signature term contained therein. In addition, the signature term(s) identified in a captured payload forms an ordered sequence of signature term(s). For example in FIG. 1, the captured payload A (122a) includes the ordered sequence of <LCS A (123b), LCS B (123d), LCS K (125b)>, the captured payload B (122b) includes the ordered sequence of <LCS K (125b), LCS B (123d)>, the captured payload M (122m) does not include any ordered sequence of signature term(s), and the captured payload N (122n) includes the ordered sequence of <LCS A (123b)>. As described above, LCS C (124d) is not determined as a signature term therefore is excluded from the ordered sequence of signature terms.

In one or more embodiments, the signature generator (106) is further configured to represent each of the captured payloads in the training set (121) as a regular expression based on the signature terms (e.g., signature term A (132a), signature term B (132b), signature term K (132k)) contained in the signature library (131). In particular, the regular expression describes the aforementioned ordered sequence of signature terms in the captured payload. For example, the captured payload A (122a) may be represented as a regular expression based on the signature term A (132a), signature term B (132b), and signature term K (132k) corresponding to the LCS A (123b), LCS B (123d), and LCS K (125b). Similarly, the captured payload B (122b) may be represented as a regular expression based on the signature term K (132k) and signature term B (132b) corresponding to the LCS K (125b) and LCS B (123d). The captured payload N (122n) may be represented as a regular expression based on the signature term A (132a) corresponding to the LCS A (123b). Although the example here shows regular expressions based on one, two, or three signature terms, other example captured payloads (not shown) represented by regular expressions having any number of signature terms may be found in the training set (121).

In one or more embodiments, the signature generator (106) is further configured to represent the collection of regular expressions in the training set (121), which are based on signature terms in the signature (133), as a nondeterministic finite automaton (NFA) (134) and store it in the signature library (131) as associated with the signature (133). In one or more embodiments, algorithms known to those skilled in the art may be used to convert the collection of regular expressions into the NFA (134). An example of converting the collection of regular expressions into the NFA (134) is described in reference to FIGS. 3a-3g below.

In one or more embodiments, the classifier (103) is configured to match a newly received flow (e.g., flow (113a) to the signature (133) using the NFA (134). In particular, the newly received flow is not part of the training set. The flow (113a) is said to match the signature (133) if the flow (113a) contains any regular expression in the training set (121). An example of using NFA simulation based on the NFA (134) to match the flow (113a) to the signature (133) is described in reference to FIGS. 3a-3g below.

As described in reference to FIGS. 3a-3g, the NFA is simulated by maintaining a set of active states. When the number of paths in a NFA is large, the number of active states may increase to a point to drastically degrade the matching performance. For example, if the number of signature terms (e.g., signature term A (132a), etc.) in the signature (133) is a large number, the NFA (134) may also have a large number of paths. Two thresholds may be employed to reduce the number of signature terms in the signature (133), namely: signature term popularity threshold P and signature terms count threshold N. The signature term popularity threshold is used to select only those signature term candidates with a probability greater than P. For example, probability A (133a) needs to exceed P for the signature terms A (132a) to be included in the signature (133). The signature terms count threshold is used to select at most the top-N signature term candidates with the highest probabilities. In one or more embodiments, the signature generator (106) is configured to further qualify the identified signature term candidates into signature terms based on the additional requirements imposed by the signature term popularity threshold and the signature terms count threshold.

Figure 3A:
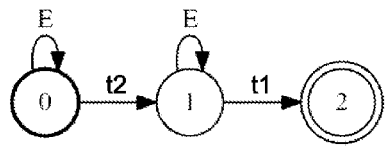
FIGS. 3a-3g, 3i-3k, 3m-3n, and 3p show various examples according to aspects of the invention.

In some examples, several important signature term candidates may be eliminated by imposing the above thresholds. For example, consider the popular HTTP protocol. There are several methods used in this protocol, such as GET, POST, HEAD, PUT, DELETE, etc. Each of these methods may not have a high probability of occurrence; however all of these methods do occur when analyzing many HTTP flows. Signature term candidates representing these methods will be eliminated by a high setting of signature term popularity threshold. In one or more embodiments, the signature generator (106) is configured to implement mutually exclusive signature term grouping, which is a process by which signature term probabilities are grouped together before comparing to the signature term popularity threshold for including in the signature (133). Specifically, this occurs when two conditions are satisfied: (1) the signature terms that belong to the same mutually exclusive signature term group do not occur in the same flow payload, i.e., the signature terms occur mutually exclusively from each other and (2) the combined probability of all signature terms in a mutually exclusive signature term group exceeds the signature term probability threshold. Note that the combined probability of a mutually exclusive term group is the sum of the probabilities of all the signature terms in the group. We add all the terms in the mutually exclusive As will become clear based on later description in reference to FIGS. 3a-3g, even when the number of signature terms is relatively small in the signature (133), the number of paths in the NFA (134) may still be large due to two factors: (i) a large number of unique signature term sequences of different length may occur from a small set of signature terms as the length of the signature term sequences is not fixed, and (ii) presence of self loops on all internal states means any state that is added to the set of active state is never removed. Thus a large number of active states may exist at each step of matching at classification time resulting in performance degradation. To illustrate this further, the NFA (300) shown in FIG. 3i is considered. For this NFA, table 1 shows the set of all active states after each signature term is examined in a flow payload according to the NFA simulation scheme described in reference to FIGS. 3a-3g below. It can be seen that four states are active simultaneously after matching three signature terms. This implies that when the next term in the sequence arrives, all four active states have to be examined and their transitions thereafter. Also, this could result in more active state in the next step. This operation becomes very expensive when the NFA is even larger.

TABLE 1

| Sequence Observed | Set of Active State |
| --- | --- |
| < > | {0} |
| <$t_1$> | {0, 1} |
| <$t_1$, $t_3$> | {0, 1, 2} |
| <$t_1$, $t_3$, $t_1$> | {0, 1, 2, 3} |

One solution to the above matching performance degradation is to generate a deterministic finite-state automata (DFA) from the NFA. A DFA has only one active state at any time. There is a one-to-one correspondence between NFA and DFA, i.e., any NFA can be converted to an equivalent DFA that accepts the same regular expression language. However, converting a NFA to DFA can lead to state explosion. For application signatures containing a large number of unique signature term sequences, this state explosion can have severe impact on the memory requirements. In summary, DFAs are time-efficient but space-inefficient, and NFAs are space-efficient but time-inefficient.

In one or more embodiments, the signature generator (106) is further configured to represent the collection of regular expressions in the training set (121), which are based on signature terms in the signature (133), as a modified term transition state machine (MTTSM) (135) and store it in the signature library (131) as associated with the signature (133). In particular, the MTTSM (135) overcomes the limitations of NFA (134) for flow classification. Generally, a MTTSM (e.g., MTTSM (135)) falls in between the class of NFAs and DFAs, having the space characteristics similar to NFA and run-times similar to DFAs. It is noted that the benefits of MTTSM come at the cost of some accuracy. However, as discussed above, this inaccuracy is acceptable for the system (100) in that it only increases false negatives but not false positives.

In one or more embodiments, MTTSM (135) is equivalent to the NFA (134) with the exceptions that all self loops on internal states are eliminated without adding additional states. In this sense, MTTSM (135) is similar to the term transition state machine (TTSM) described in the related U.S. patent application Ser. No. 13/039,180 filed Mar. 2, 2011 and entitled "System and Method for Using Network Application Signatures Based On Term Transition State Machine," which is incorporated herein by reference, with the exceptions that all state transitions are annotated with (or assigned) a transition probability in TTSM but not in MTTSM. In one or more embodiments, the MTTSM (135) is generated from the NFA (134) by eliminating all self loops on internal states of the NFA (134) without adding additional states. In one or more embodiments, the MTTSM (135) is generated directly from the collection of regular expressions in the training set (121) without the intermediate step of generating the NFA (134).

Multiple paths in the MTTSM (135) may share multiple transitions resulting in sub-optimal state machine representation. In one or more embodiments, the distiller (107) is configured to modify the MTTSM (135) be reducing such overlapping transitions.

In one or more embodiments, all flows in the training set (121) shares the same port number as described in related U.S. patent application Ser. No. 13/039,125 filed Mar. 2, 2011 and entitled "System and Method for Determining Network Application Signatures Using Flow Payloads." Multiple MTTSMs (e.g., MTTSM (135), etc.) generated from training sets (e.g., training set (121)) having different port numbers may be identical indicating that a particular network application may be running on many different ports. In one or more embodiments, the distiller (107) is configured to merge these identical state machines (e.g., MTTSM (135), etc.) into one MTTSM (e.g., MTTSM (135)) for the network application.

Multiple protocols/applications, although significantly different from each other, may share paths in their state machines (e.g., MTTSM (135), etc.). These paths, when traversed by a flow during an operation of the classifier (103), may lead to multiple classification results for the flow, which may or may not conflict with each other. In one or more embodiments, the distiller (107) is configured to identify and extract these overlapping paths to create an additional MTTSM with multiple network application labels (concatenation of network application labels from all the MTTSMs) associated with them. This may improve the state machine comparison in the operation of the classifier (103). For example, instead of using separate processing threads to match multiple MTTSMs on a overlapping path, one processing thread may be used to match the overlapping path in multiple MTTSMs. In addition, confidence scores may be assigned to each network application label in this additional MTTSM created for the overlapping path. This will help the user to make more informed decisions regarding a flow that is assigned multiple network application labels in the classification result.

More details of the operations performed by the distiller (107), supplemental to the signature generator (106) and the classifier (103), are described in reference to FIG. 2a below.

In one or more embodiments, the classifier (103) is configured to match a newly received flow (e.g., flow (113a)) to the signature (133) using the MTTSM (135). In particular, the newly received flow is not part of the training set. The flow (113a) is said to match the signature (133) if the flow (113a) contains any regular expression in the training set (121). More details of using the MTTSM (135) to match the flow (113a) to the signature (133) is described in reference to FIGS. 2b-3i below.

In one or more embodiments, the TTSM (135) is assigned a state machine confidence score in the signature generation process (e.g., based on the diversity and number of flows considered for signature generation). In addition, each path in the TTSM (135) may also be assigned a path confidence score (e.g., based on path length, path frequency, and/or the strength of the terms that make up the path). In one or more embodiments, the state machine confidence score and/or the path confidence score may be used to calculate a confidence score of a result of the classifier (103). More details of calculating and using such confidence score of the classification result are described in reference to FIG. 2a below.

Figure 2A:
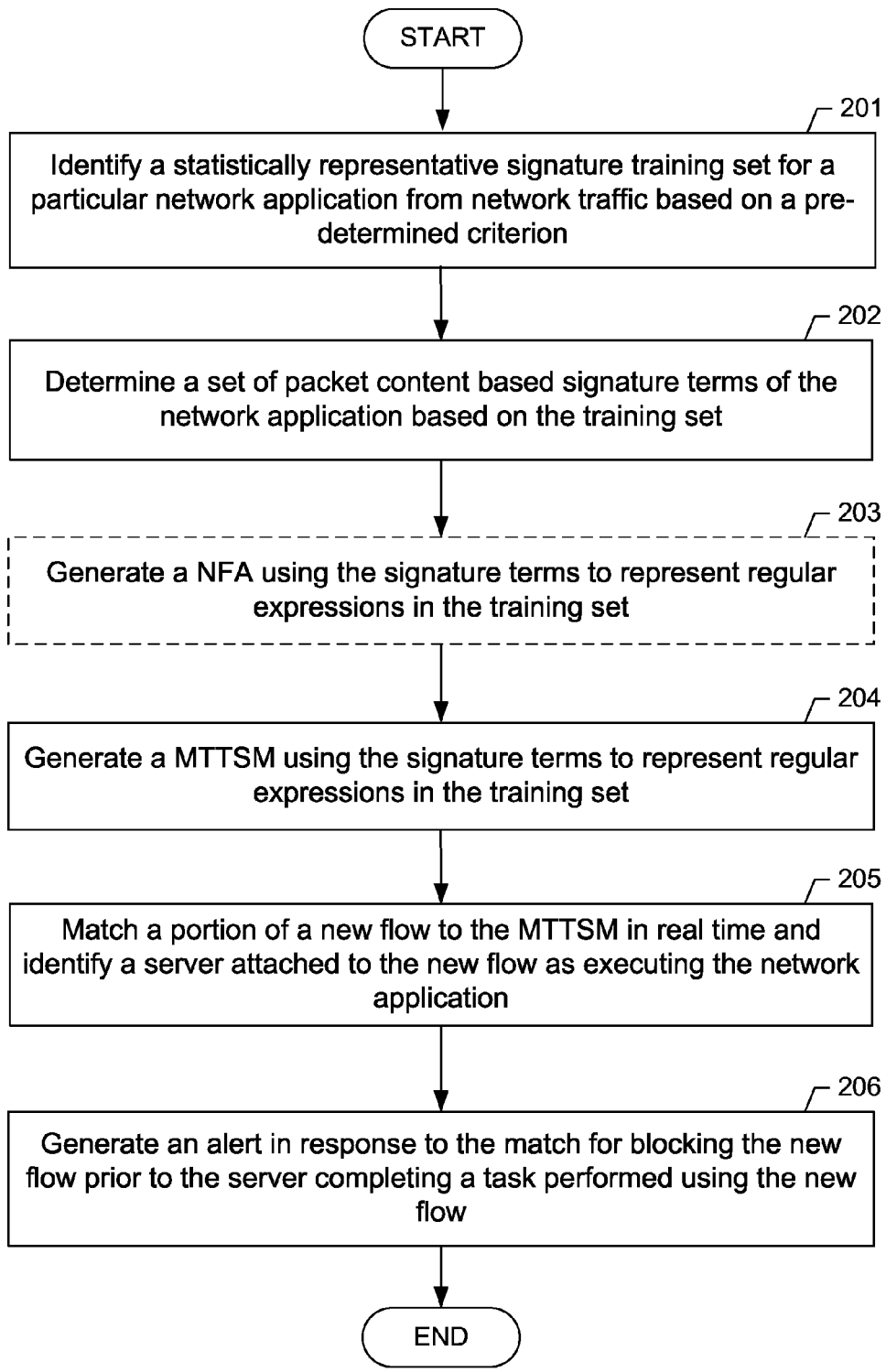
FIGS. 2a and 2b show flowcharts of a method according to aspects of the invention.
Figure 2B:
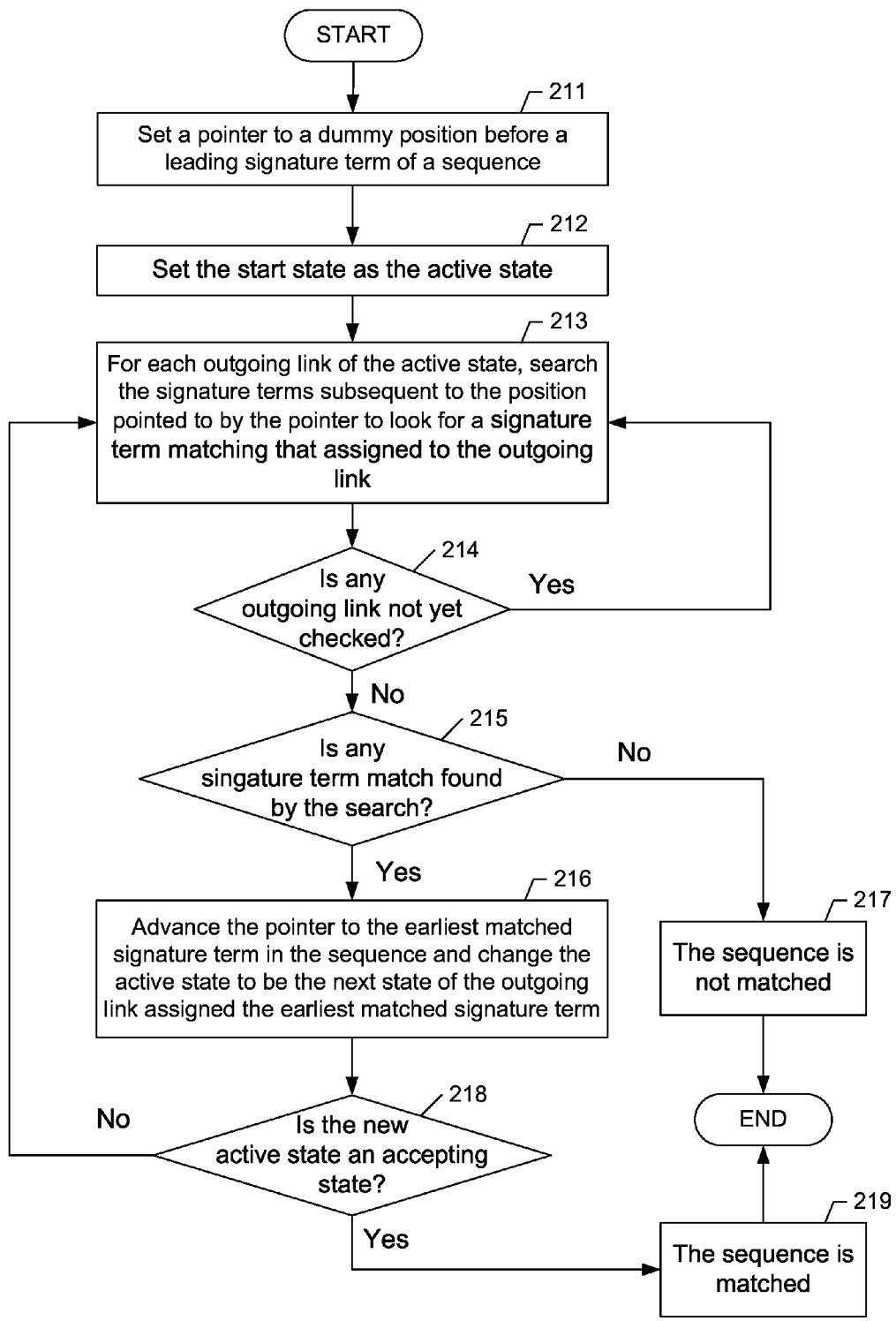

FIGS. 2a and 2b depict a flowchart of a method in accordance with one or more embodiments of the invention. In one or more embodiments of the invention, one or more of the steps shown in FIGS. 2a and 2b may be omitted, repeated, and/or performed in a different order. Accordingly, embodiments of the invention should not be considered limited to the specific arrangements of steps shown in FIGS. 2a and 2b. In one or more embodiments of the invention, the method depicted in FIGS. 2a and 2b may be practiced using system (100) described with respect to FIG. 1 above.

In particular, the method depicted in FIG. 2a automatically extracts payload content based signatures using the flow payloads in the incoming flow-sets associated with a network application. For example, the most frequently occurring terms are extracted from the flows identified by a unique (port number, transport protocol) pair. In other examples, different method may be used to extract payload content based signatures. Further, these terms are used to automatically build a modified term transition state machine (MTTSM), which is used as the application signature to classify other flows as associated with the network application. The method depicted in FIG. 2b uses the MTTSM to classify a new flow according to transition probabilities in the MTTSM.

Turning to the discussion of FIG. 2a, initially in Step 201, a statistically representative signature training set is identified for a particular network application (e.g., layer-seven applications, such as HTTP, SMTP, etc.) from network traffic based on a pre-determined criterion. In one or more embodiments, the training set includes a set of captured payloads corresponding to a set of flows obtained from the network traffic. For example, the set of flows may be a cohesive flow set with each flow having the same (port number, transport protocol) as described in related U.S. patent application Ser. No. 13/039,125 filed Mar. 2, 2011 and entitled "System and Method for Determining Network Application Signatures Using Flow Payloads," which is incorporated herein by reference. In other example, different criteria may be used to obtain the flow-set and identify the training set therefrom.

In Step 202, a set of packet content based signature terms of the particular network application is determined based on a pre-determined algorithm. For example, the set of signature terms may be selected from longest common substrings extracted from the captured payloads in the training set as described in related U.S. patent application Ser. No. 13/039,125 filed Mar. 2, 2011 and entitled "System and Method for Determining Network Application Signatures Using Flow Payloads," which is incorporated herein by reference. In other example, different algorithms may be used to identify the set of signature terms from the training set payloads.

In one or more embodiments, signature terms (i.e., the longest common substrings) are extracted by comparing two flow payloads with each other. The quality of the extracted signature terms may affect both the quality of final signatures and the efficiency of real-time classification. To ensure a high quality of extracted signature terms, the extracted signature terms are qualified based on a pre-determined set of rules (i.e., heuristics). Example rules for qualifying the extracted signature terms are described below.

When multiple payloads are compared with each other, many short signature term candidates are extracted. However, these short signature term candidates add little value in determining whether a particular flow belongs to a given network application or not. On the other hand these short signature term candidates may randomly match parts of the flow payload due to pure coincidence, thus resulting in false positives and false negatives. It is discovered from actual network data that most of the meaningful terms have length at least 4 bytes. Although using such a small threshold value may result in eliminating certain signaure term candidates that may be useful in distinguishing an network application (e.g., the term OK+ is an important term in identifying the FTP protocol, the goal is not to parse the message formats of the protocols/applications but to just classify flows as belonging to different protocols/applications. In one or more embodiments, the benefits of reducing the false positives/negatives supersedes the loss of certain signature term candidates, such as OK+.

For certain flow payloads, several control characters may get extracted as part of the signature terms since the protocol/application is not parsed in the extraction process. Further, control characters may have different representation based on the end systems involved. For example, it is discovered that the control character "carriage return (CR)" is sometimes represented as 0x0d and other times as 0x3064. In one or more embodiments, all signature term candidates are tokenized using a pre-determined set of control characters as the delimiters. In other words, long signature term candidates containing these special characters (e.g., "CR", "LF", ":", or other non-printable ASCII characters) are split into shorter signature term candidates. For example, a signature term candidate "BITTORRENT[0x0d]PROTOCOL" is split into "BITTORRENT" and "PROTOCOL".

A flow originating from any protocol/application typically has some fields that always occur but does not have any relevance to the protocol/application. One such example is the time/date field. For example, if all the flows in the training set for signature extraction were collected in the same month of the year, then the name of the month and the year will appear as part of the signature term set. It is important that we remove these terms to ensure that we have high quality signatures that can be used for efficient real-time classification. In one or more embodiments, signature term candidates such as "MON", "MONDAY", "TUES", "TUESDAY", "JAN", "JANUARY", "FEB", "FEBRUARY", "2010", "2011", etc. are disqualified and removed. In one or more embodiments, signature term candidates identifying specific domains in WWW such as ".COM", ".EDU", etc. are also disqualified and removed.

Many flows in the training set may carry several different parameter values. These parameter values in many situations are numeric values. In one or more embodiments, such values are identified and eliminated based on a rule to eliminate any signature term candidates that does not contain at least two alphabetic characters. For example, signature term candidates such as "2E00", "/0/0/0/", "0.001", etc. are eliminated.

In one or more embodiments, a portion of the captured payloads in the training set is represented as regular expressions. Specifically, each regular expression includes a sequence of one or more signature terms based on the set of signature terms.

Optionally in Step 203, the regular expressions are represented as a nondeterministic finite automaton (NFA) known to those skilled in the art. An example scheme to generate a NFA may be automatically from the regular expressions is described in reference to FIGS. 3a-3g below. In particular, the NFA includes multiple states coupled by links representing state transitions. Typically, an internal state of the NFA includes a self loop transition returning to itself. This NFA may be used as an intermediate step in generating a MTTSM.

An example of Steps 201 through 203 may start with collecting several flows for SMTP protocol to form a SMTP training set from the aforementioned cohesive flow-set. Using this SMTP training set, several flow-subsets (e.g., with 50-100 flows in each subset) are constructed. These flow-subsets form the input to the common term extraction (ECT) algorithm presented in the aforementioned related U.S. patent application Ser. No. 13/039,125 filed Mar. 2, 2011 and entitled "System and Method for Determining Network Application Signatures Using Flow Payloads". The ECT algorithm returns a set of all terms that are common between at least two distinct flows in each flow-subset that meet a minimum length requirement. For example, the common strings extracted from any pair of flows in a flow-subset should be at least four bytes long, ensuring that accidental small length string matches are automatically filtered out. In an example SMTP training set identified from a real-life network trace, the ECT algorithm may extract more than 1200 terms in this step.

A large set of terms will significantly increase the computational complexity. Also, considering trivial terms that do not occur frequently in the flows will result in unwanted overhead. However, each term in a "mutually exclusive term group" can have lower probabilities, but the overall probability of the group can be high. In order to accommodate all of these criteria, the output of ECT is qualified using a probability threshold (e.g., 0.1). In an example, all the terms with a probability of occurrence that is less than 0.1 are eliminated. In the aforementioned example network trace, close to 100% of the terms having less than a probability of 0.1 are confirmed to be trivial/noise terms. Using this threshold significantly reduces the number of terms in the term set. In fact, in the aforementioned SMTP training set based on the real-life network trace, the number of terms is reduced from over 1200 to about 200.

Returning to the discussion of FIG. 2a, in Step 204, A MTTSM is generated from the regular expressions created in Step 202 above. Described above in reference to FIG. 1, the MTTSM includes multiple states coupled by a number of links. In one or more embodiments, a first link, coupling first and second states of the MTTSM to form a portion of a first path representing a first regular expression, is assigned a first signature term in the first regular expression to represent a first state transition associated with the first signature term. Further, a second link, coupling the first state and a third state of the MTTSM to form a portion of a second path representing a second regular expression, is assigned a second signature term in the second regular expression to represent a second state transition associated with the second signature term.

In one or more embodiments, the MTTSM is generated directly from the regular expressions For example, the MTTSM may be generated using similar schemes as used for generating NFA from the regular expressions with the exception that any self loop transition(s) generation is/are skipped. In one or more embodiments, the MTTSM is converted from the NFA generated in the optional Step 203 by eliminating all self loop transition(s) in the NFA.

As described above in reference to FIG. 1, signature terms may be qualified and MTTSM, representing signature term based regular expressions, may be optimized in an examination process, e.g., using the distiller module described in FIG. 1 above. In one or more embodiments, the distiller module described in reference to FIG. 1 may be further configured to qualify the signature and optimize the MTTSM as described below.

Let TS(A) denote the set of eligible terms extracted from a flow set belonging to the application A. Let SM(A) represent the MTTSM of application A constructed using the term set TS(A). Let P(A) represent the set of all paths in SM(A), and $p_i(A) \in P(A)$ represents the $i^{th}$ path in SM(A). Note that a path always starts from state 0 in MTTSM and ends at an accepting state.

The overlap between the term sets used to construct MTTSMs can be used as a first level indicator of the possible state machine relationship. In other words, a non-overlapping term set indicates that the MTTSM derived from them will not have any overlaps/conflicts. However, a overlapping term set may or may not have overlapping MTTSMs. Note that comparing the term sets of two applications with each other is a much simpler operation than comparing all paths in a MTTSM. Hence, in order to derive relationships between different MTTSMs, the first step is to compare term sets and to compare the MTTSMs depending on the relationship between term sets.

Let the Term Set Relation (TSR) between the term sets of applications A and B as TSR(A,B). Generally, TSR(A,B) may include the following:

(I) Disjoint Term Sets (DTS): Term sets of applications A and B have no common terms, i.e., $TS(A) \cap TS(B) = \emptyset$. In one or more embodiments, applications that have no common terms are split into different groups and signature terms extracted for them independently. Also to improve classification performance, signatures belonging to DTS applications can be matched in parallel (for example, using separate threads that do not exchange any information).

(II) Equal Term Sets (ETS): Term sets of applications A and B are equal, i.e., TS(A)=TS(B). Applications that have the same term sets can be checked for state machine equivalence (III) Contained Term Sets (CTS): Term set of application A contains the term set of application B, i.e., $TS(A) \supset TS(B)$. Applications which have the term sets contained in another can be checked for sub-state machine match.

(IV) Partial Overlap Term Sets (POTS): Term sets of applications A and B contain some common terms, i.e., $TS(A) \cap TS(B) \neq \emptyset$. Applications which have partially overlapping term sets can be checked for strong/weak partial state machine match described below.

In one or more embodiments, comparing MTTSMs includes assessing the relationship between various paths in the two state machines. When two paths, $p_i(A) \in P(A)$ and $p_j(B) \in P(B)$, are compared there can be three possible outcomes:

(I) Weak Path Match (WPM): $p_i(A)$ has a weak path match to $p_j(B)$ if: (i) Both $p_i(A)$ and $p_j(B)$ start at the same start state (i.e., state 0 in MTTSM), and (ii) $p_i(A)$ has length smaller than $p_j(B)$, and (iii) All transitions in $p_i(A)$ match transitions along $p_j(B)$.

(II) Strong Path Match (SPM): $p_i(A)$ and $p_j(B)$ are considered to have a strong match when: (i) Both $p_i(A)$ and $p_j(B)$ start at the same start state (i.e., state 0 in MTTSM), and (ii) $p_i(A)$ has the same length as $p_j(B)$, and (iii) All transitions in $p_i(A)$ match transitions along $p_j(B)$.

(III) No Path Match (NPM): $p_i(A)$ has no path match to $p_j(B)$ if the paths $p_i(A)$ and $p_j(B)$ have at least one different term transition.

Based on the relationship (e.g., WPM, SPM, or NPM) between various paths of two MTTSMs (e.g., SM(A) and SM(B)), the relationship between two MTTSMs (e.g., SM(A) and SM(B)) may include:

(I) Weak Sub State Machine Match (WSSMW): SM(A) is considered as a weak sub-state machine of SM(B) if: (i) the number of states in SM(A) is smaller than number of states in SM(B), and (ii) each path in P(A) has a PM (path match) with some path in SM(B), and (iii) at least one of the path matches is a WPM (weak path match).

WSSMW indicates some commonality in the signatures but is not a strong indicator. New signatures may be generated by relaxing the signature generator parameters while generating the signatures again. The new signatures may have a much smaller overlap or no overlap at all, thus eliminating the possibility of making incorrect or dubious decisions in the classifier.

(II) Strong Sub State Machine Match (SSSMM): SM(A) is considered as a strong sub-state machine of SM(B) if: (i) the number of states in SM(A) is smaller than number of states in SM(B), and (ii) each path in P(A) has a SPM (strong path match) with some path in SM(B).

SSSMM indicates that the two applications are closely related. It may be that application B is tunneled inside application A and hence whenever a flow matches B it will also matches A. Although a classifier might give multiple labels for a single flow in this context, these multiple labels (that have a SSSMM relationship) might offer a network operator more information (for instance, the existence of a tunneled application) to make the right decision. In one or more embodiments, these common paths are extracted as a new MTTSM. The label for this new MTTSM is a combination of the two original labels of the MTTSMs associated with the applications A and B. The common paths are deleted from the original MTTSMs of the applications A and B. In one or more embodiments, the new MTTSM is generated and the original MTTSMs modified automatically without user (e.g., a network operator) intervention. In one or more embodiments, the state machine matching status SSSMM is displayed to the user (e.g., a network operator) while the new MTTSM is generated and the original MTTSMs modified in response to an input from the user (e.g., a network operator).

(III) Equivalent State Machine Match (ESMM): SM(A) and SM(B) are considered to be equivalent when: (i) the number of states in SM(A) is equal to the number of states in SM(B), and (ii) There is a one-to-one SPM (strong path match) between all paths in P(A) and P(B).

ESSM is usually an indicator of the existence of the same application in different flow sets. A typical case is the BitTor rent application. It is discovered that this application runs on several different ports and hence constructing flow sets using port numbers will result in the same MTTSM for multiple flow sets. From a classification perspective, applications that try to hide by using different port numbers or making minor modifications to their flow payload can be identified considering ESSM. Using ESSM metric, the distiller identifies equivalent state machines and merges them into one. This improves the classifier performance as the number of state machines that need to be matched in sequence reduces. In one or more embodiments, the original MTTSMs are merged automatically without user (e.g., a network operator) intervention. In one or more embodiments, the state machine matching status ESSM is displayed to the user (e.g., a network operator) while the original MTTSMs are merged in response to an input from the user (e.g., a network operator).

(IV) Strong Partial State Machine Match (SPSMM): SM(A) and SM(B) are considered to have a strong partial state machine match when some path in P(A) has SPM with another path P(B) or vice versa.

SPSMM indicates that the two applications, A and B, share some commonality. This could be because they are tunneled inside the same outer application C or because they have some commonality in protocol messages. In one or more embodiments, a new state machine is extracted from the common paths in the MTTSMs that are determined to be exhibiting SPSMM. With the common paths extracted, the original MTTSMs are modified to be disjoint in the sense that they no longer share any common paths. The new state machine has a label that is created by concatenating the labels in the original MTTSMs associated with the applications A and B. If the classifier returns this new label, the user can infer that the flow is matching two distinct applications A and B in a tunneling configuration inside the application C previously identified during the signature generation phase. On the other hand, if the classifier returns the two original labels assigned to now disjoint MTTSMs, an alert is generated indicating a potential malicious event. In one or more embodiments, the new MTTSM is generated and the original MTTSMs modified automatically without user (e.g., a network operator) intervention. In one or more embodiments, the state machine matching status SPSMM is displayed to the user (e.g., a network operator) while the new MTTSM is generated and the original MTTSMs modified in response to an input from the user (e.g., a network operator).

In one or more embodiments, the aforementioned state machine matching and/or modification information is displayed to a user, such as a network operator. For example, during the matching performed in Step 205 below, this displayed information may be used as indicators of the quality of matching a new flow to various MTTSMs. Although such matching and modification discussed above is performed for MTTSMs, it is contemplated that the same techniques can be applied to other state machines such as NFA. For example, the method described in reference to FIG. 2 may be modified to apply to NFA without the Step 204 where the NFA is optimized using the state machine comparison and modification techniques described above.

In one or more embodiments, the signature generation module generates trie-like automaton. The advantage of this is the ease of construction and sharing of states whenever prefix (the first few term transitions of a path) of two paths are common. A disadvantage of this approach is that there is redundancy when paths share suffixes (i.e., the last few term transitions of a path). In the distiller module, such redundant suffixes are identified and merged to generate directed-acyclic-graph-like (DAG-like) automata. In one or more embodiments, such merging to eliminate redundancy is performed in two passes over the MTTSM. In the first pass, the states are recursively as follows:

(I) If a state has only one out-going transition, then the label for the state is created by concatenating the term on the transition, the keyword "DOT", and the label for the next state. This essentially represents the label for the path starting at the state under consideration.

(II) If a state has multiple out-going transition, then the label for the state is created by first creating the individual path labels starting from the state under consideration and concatenating these labels, with "OR" in between.

(III) Finally for any accepting state, "END" is prepended to the label. Note that this means that accepting states with no out-going transitions get the label "END".

In the second pass, the states are recursively examined starting from the start state (depth first traversal). At each state, the next state labels are examined. If the label of the next state has not been seen before, the next state is added to a hashtable which is keyed by state labels. If the label has been seen before, the next state is pointed to the state in the hashtable having the same label. This ensures that common suffixes in paths are merged. Note that including the accepting state information in the labels ensures that accepting and non-accepting states are not merged. Hence the matching semantics of this DAG-like automaton is same as that of the trie-like automaton.

Confidence scores for every match in the classifier may be used to resolve ties, if necessary, when there are multiple matches. The confidence scores for a match in the classifier are calculated from state machine confidence score and path confidence score. In one or more embodiments, state machine confidence score for a MTTSM is calculated as the confidence score for the training set used to generate the MTTSM. For example, the confidence score for the training set may be computed based on the number of server IP-addresses used and the number of flows considered by the ECT algorithm used for signature generation as described in the related U.S. patent application Ser. No. 13/039,125 filed Mar. 2, 2011 and entitled "System and Method for Determining Network Application Signatures Using Flow Payloads."

In addition to the overall state machine confidence score, different paths in a MTTSM can be assigned path based confidence scores to estimate the match quality in the classifier. For example, the distiller module may be configured to provide three path based confidence measures for estimating the quality of a match in the classifier. These confidence scores are described below.

(I) Term Frequency-Inverse Document Frequency (tf-idf) is a weight representing importance of a word to a document in a collection. Generally, the importance of a word increases with its frequency in a document but reduces with increase in the number of documents containing that word. In particular, a high tf-idf word indicates that the word is good for identifying a document in a collection. In one or more embodiments, the term sets used for signature generation are scored based on the tf-idf. For example, a MTTSM corresponds to a document and the set of all MTTSMs corresponds to the overall collection in calculating tf-idf for a signature term. First, the signature term frequency (corresponding to tf) of signature term i of a MTTSM j is calculated as $$tf_{i,j} = n_{i,j} \bigg/ \sum_{k=0}^{K} n_{k,j}$$

where the numerator is the number of times the signature i occurs in the MTTSM j, and the denominator is the total number of terms in the MTTSM j. Then, the inverse state machine frequency (corresponding to idf) of the signature term is calculated as:

$$idf_i = \log |S|/|j: i \in j|$$

where the numerator is the total number of MTTSMs, i.e., the size of the set of all MTTSMs. The denominator is the number of MTTSMs that contain the signature term i. Finally, the tf-idf of the signature term is computed as:

$$(tf\text{-}idf)_{i,j} = tf_{i,j} \times idf_j$$

To compute the confidence score of a match along a path, a statistical parameter (e.g., maximum, average, median, or other suitable metric) is extracted from a distribution of tf-idf of all signature terms along a path and assigned as a score to the accepting state. Accordingly, a high score is assigned to paths which have signature terms with high tf-idf values.

(II) Term Transition Probabilities along a Path may be computed as described in the related U.S. patent application Ser. No. 13/039,180 filed Mar. 2, 2011 and entitled "System and Method for Using Network Application Signatures Based On Term Transition State Machine." It is noted that the transition probabilities are weakly decreasing along a path. In other words, the last transition in a path has the lowest probability amongst all transitions along a path. Hence the probability of the last transition on a path may be considered as the representative probability of the path being taken. Accordingly, a high confidence score may be assigned to paths that have large values of last term transition probability.

(III) Longer path lengths are typically better signatures than shorter path lengths. One of the confidence scores that the distiller module assigns is based on the path length where longer paths get higher scores.

In one or more embodiments, the state machine based and path based confidence scores are displayed to a user, such as a network operator, For example, during the matching performed in Step 205 below, these displayed confidence scores may be used as indicators of the quality of matching a new flow to the MTTSM.

In Step 205, a portion of a new flow is matched, in real time, to the MTTSM based on a pre-determined scheme, such as described in reference to FIG. 2b below. As a result, a server associated with the new flow is determined as executing the network application associated with the training set. For example, using today's computer resources, a sufficient portion of a flow under classification may be matched within seconds using the MTTSM. Therefore, a malicious network application executing on a server may be identified before a malicious task is performed by completing the flow under classification. Accordingly, an alert may be generated to allow a user (e.g., an operator of the network) to terminate or block the flow under classification prior to the malicious task is performed.

In one or more embodiments, a match requires a confidence score exceeding a pre-determined threshold. In one or more embodiments, a match is disqualified when a confidence score is below a pre-determined threshold. In one or more embodiments, a flow is sent back to the signature generation module to be added to the training set for re-generating the signature if a confidence score of the match is below a pre-determined threshold.

Continuing with the discussion using the aforementioned SMTP training set, the occurrence probability for signature terms was required to be at least 0.1 to eliminate the "noise" in the signature term set. An additional probability threshold (referred to as popularity threshold) may be defined to qualify those signature terms that are the important ones. In the aforementioned example SMTP training set, the popularity threshold is set to be 0.8. Stated otherwise, a signature term with probability greater than 0.8 will be considered as an important signature term. Using this popularity threshold on the SMTP signature term set having approximately 200 signature terms from the previous step resulted in two signature terms—MAIL and RCPT. These two signature terms form the signature term set that is sent to the MTTSM algorithm for signature generation.

Construction of MTTSM from the example SMTP training set maybe illustrated by considering two example payloads in the SMTP training set below.

| | |
|---|---|
| Payload-1 | EHLO ???? MAIL FROM: <abc@xyz.com>?? RCPT TO: <def@xyz.com>??DATA?? |
| Payload-2 | HELO ???? RCPT ??? MAIL ???? <bbb@pqr.com> ??? |

In the first payload, the term MAIL appears before the term RCPT. Since this is the first payload that the MTTSM algorithm scans, there is no state machine that already exists. Hence the MTTSM algorithm constructs the state machine as shown in FIG. 3k. Note that the accepting state is state 2. Now, the next step is to process Payload-2 to result in a state machine as shown in FIG. 3m. Note that now there are two accepting states—state 2 and state 4. In these steps, we the mutually exclusive term group is not considered in order to generate the state machine. Hence only those terms with the probability greater than the example popularity threshold 0.8 are considered. However, in the case of SMTP, one mutually exclusive term group exists with two terms—HELO and EHLO. These two terms never occur in any payload together, but at least one of them always occurs in SMTP flows. The total probability of this mutually exclusive set is greater the example popularity threshold 0.8. Including these two terms in the signature term set now results in four terms in the set. The MTTSM algorithm will consider one payload at a time to generate the final MTTSM. The results of two steps (one after processing Payload-1 and the other after processing Payload-2) are shown in FIGS. 3n and 3p. Subsequently, transition probabilities are calculated and assigned to various links in the statement machine of FIG. 3p to complete the MTTSM.

As noted above, the method depicted in FIG. 2b uses the MTTSM generated based on the method depicted in FIG. 2a to classify a new flow. Specifically, the new flow is analyzed to identify all signature terms in the signature term set generated in Step 202 of FIG. 2a above. These signature terms in the new flow forms a sequence of signature terms that is scanned based on the MTTSM to classify the new flow.

Initially in Step 211, a pointer is set to point to a dummy position preceding a leading signature term at the very beginning of the sequence of signature terms. In step 212, the start state of the MTTSM is set as the active state. In the subsequent steps, the pointer and active state are updated as the MTTSM is traversed to sequentially scan the sequence of signature terms identified from the flow under classification.

In step 213, for each outgoing link of the active state, the signature terms are scanned in a consecutive portion of the signature term sequence immediately behind a position pointed to by the pointer to look for a match. Said in other words, the scanned portion of the signature term sequence is subsequent to the very signature term pointed to by the pointer. Initially, this portion is the entire signature term sequence because the pointer points to the dummy position in front of the entire signature term sequence. As the method traverses the loop of Steps 213 through 216, this portion is progressively reduced. Each time this portion of the signature term sequence is scanned, search is performed to look for an earliest signature term in the signature term sequence that matches any of the signature terms assigned to outgoing links from the active state.

When multiple matches are found, which requires that a first signature term and a second signature term are (i) both assigned to outgoing links of the active state and (ii) both contained in the scanned portion of the signature term sequence, a first position and a second position of the first signature term and the second signature term, respectively, in the scanned portion of the signature term sequence are compared to generate a comparison result. Based on the comparison result indicating that the first position is ahead of the second position in the scanned portion of signature term sequence, the outgoing link assigned the first signature term is traversed in the MTTSM to generate an analysis result. In particular, when this outgoing link is traversed, the next state of the traversed outgoing link is assigned as the new active state while the portion in the signature sequence to be scanned based on the new active state is reduced to start from a position immediately behind the first position.

Specifically in Step 214, a determination is made as to whether any outgoing link of the active state has not been checked. If the answer in Step 214 is yes, the method returns to Step 213 to continue the search for any not yet checked outgoing link. If the answer in Step 214 is no, the method proceeds to Step 215 where another determination is made as to if any signature term match has been found by checking all outgoing links of the active state. If the answer in Step 215 is no, the method proceeds to Step 217 where it is declared that the signature term sequence of the new flow under classification does not match the MTTSM. If the answer in Step 215 is yes, the method proceeds to Step 216 where the pointer is advanced to the earliest matched signature term in the scanned portion of the signature term sequence and the active state is changed to the next state of the outgoing link assigned the earliest matched signature term. As noted above, this action performed in Step 216 is referred to as traversing the outgoing link assigned the earliest matched signature term.

In Step 218, yet another determination is made as to whether the new active state an accepting state. If the answer in Step 218 is no, the method returns to Step 213 to scan the signature term sequence in another iteration based on the new pointer position and the new active state. If the answer in Step 218 is yes, the method proceeds to Step 219 where it is declared that the signature term sequence of the new flow under classification matches the MTTSM.

Speed performance of using MTTSM to classify a new flow described in reference to FIG. 2b above has been evaluated using three different traces from large ISPs. The first two traces are from tier-1 backbone networks, while the third trace is from a cellular service provider. The first trace is about 10 minutes long, the second trace is about 6 hours long, and the third trace is about 2 hours long. All of the traces are raw packets including the complete packet payload.

Based on the observed speed of using MTTSM to classify a new flow described in reference to FIG. 2b above, a portion of the flow under classification can be analyzed based on the MTTSM in Step 205 of FIG. 2a to determine that the server as executing the network application prior to the flow under classification is completed by the server. Said in other words, the matching process is performed concurrent with receiving the flow under classification in real time such that the server attached to the flow under classification may be determined, prior to the new flow being completed by the server, to be executing the network application associated with the signature. In particular, the network application executing on the server is undetermined prior to obtaining and analyzing the portion of the flow under classification.

Further, based on the real-time performance in performing Step 205 of FIG. 2a, an alert is generated in Step 206 of FIG. 2a in response to the match if the network application associated with the new flow is previously identified as a malicious application. Accordingly, the flow under classification may be blocked prior to the server completing a task that is being performed using the flow under classification. As an example using today's computer facilities, the flow may last from less than a second to up to a few seconds before the server completes a malicious task.

FIGS. 3a-3g shows an example for determining network application/protocol signatures in NFA format according to aspects of the invention. Specifically, FIGS. 3a-3g depicts an approach to build regular expressions based on the extracted signature terms and represent them in a NFA as network application/protocol signatures.

In an example, consider a flow that has two signature terms $t_1$ and $t_2$. The example order that the signature term $t_1$ occurs subsequent to $t_2$ in the flow can be expressed using the regular expression: $s=(.*)t_2(.*)t_1(.*)$ where $t_1$ and $t_2$ are separate by intervening wildcard substrings $(.*)$. Note that when classifying a newly received flow, once a match is identified for a sequence of signature terms in the NFA, the flow is classified (or labeled) without needing to match any additional signature terms or sequences in flow content. Hence, the above regular expression can be simplified by eliminating the trailing $(.*)$ as follows: $s=(.*)t_2(.*)t_1$.

A regular expression of the above form can be converted to a matching NFA. FIG. 3a shows the NFA corresponding to above regular expression. The NFA has three states (represented as single or double circles enclosing a name of the state) and the transitions (represented as straight arrows) among states are each labeled with an associated signature term (i.e., $t_1$, $t_2$), when found while sequentially scanning the regular expression, causes the associated transition. State 0 is the start state, state 1 is an intermediate state, and state 2 is an accepting state. An accepting state is represented as a double circle and defined as a possible last state while traversing a NFA (during flow comparison in the classifier). Note that states 0 and 1 have self loops (denoted by "E") corresponding to (*) in the regular expression.

The NFA can be used to match a sequence of terms that occurs in a flow based on various NFA matching methods, such as (i) backtracking algorithm and (ii) simulating NFA at runtime. For example, the NFA can be simulated at runtime by keeping a set of active states. Initially, the only active state is the start state. As signature terms in the sequence are examined by sequentially scanning the sequence, a new set of active states is created that includes all the states which have an in-coming transition, labeled with the signature term being examined, from any state in the current set of states. If any of the states in the new set of active states is an accepting state indicating all signature terms in the sequence has been examined, a match is said to be found. That is, the sequence is matched to the NFA and the flow containing the sequence is classified as associated with a server executing a network application having the signature represented by the NFA. Otherwise, this process continues till the complete sequence of signature terms is examined. As is known to those skilled in the art, the self loops are included to allow multiple active states such that multiple branches of an active state can be traversed when a partial match in a path along one branch of the active state may not prevent a complete match in another path along another branch of the active state.

The following is an example illustrating the signature generation and flow classification using NFA. Consider that initially MAIL and RCPT are two signature terms extracted from a flow-set. One of the flows in the flow-set has the following payload 1:
EHLO ??? MAIL FROM <abc@xyz.com> ?? RCPT TO: <def@pqr.edu> ?? DATA??

Figure 3B:
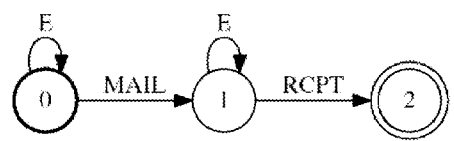

The following regular expression is identified as the application signature from this payload and represented as a corresponding NFA in FIG. 3b.
$S_1 = (.*)$ MAIL $(.*)$ RCPT Now assuming that at classification stage the following payload 2 is received:
EHLO ??? MAIL FROM <pqr@lmn.edu> ?? RCPT TO: <jkl@uvw.com> ?? DATA??

This payload contains the sequence of signature terms <MAIL, RCPT>, and the goal is to see if it can be matched to the NFA in FIG. 3b. Table 2 shows the matching process in detail.

TABLE 2

| Sequence Observed | Set of Active State |
|---|---|
| < > | {0} |
| <MAIL> | {0, 1} |
| <MAIL, RCPT> | {0, 1, 2} |

The first column shows the sequence of signature terms that are found when sequentially scanning the payload 2, and the second column represents all the active states in the NFA in FIG. 3b. The first row shows that before any signature terms are found during the sequentially scanning, the only state that is active is state 0. As can be seen in the second row, when sequential scanning finds the term MAIL, both states 0 and 1 become active. Finally when the sequential scanning finds the complete sequence of signature terms as reflected in third row, all the three states in the NFA are active. However, this set of active states contains an accepting state (i.e., state 2) and hence, this payload is said to be matched to the NFA generated from the Payload-1.

Now consider another payload in the classification stage as the following Payload-3.
HELO ???? RCPT ??? MAIL ????<bbb@pqr.com> ???)

TABLE 3

| Sequence Observed | Set of Active State |
|---|---|
| < > | {0} |
| <RCPT> | {0} |
| <RCPT, MAIL> | {0, 1} |

Table 3 shows the sequence and active states for matching Payload-3 against NFA in FIG. 3b. It can be seen that no accepting state is in the set of active states even after the complete sequence is examined during a sequential scan. This means that Payload-3 is not accepted by the NFA (i.e., matched to the NFA) and therefore, does not match signature $S_1$ above.

Figure 3C:
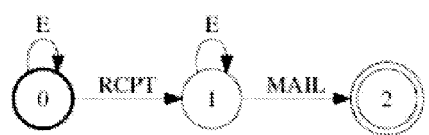
Figure 3D:
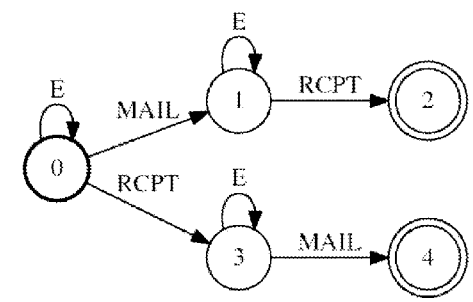

Applications typically can operate in several different modes and carry different information. This information is captured in the following example by using payloads from multiple flows to construct a signature. As noted above, a sequence of terms matches the signature if and only if it matches at least one of the several sequences of signature terms in the signature library. In other words, a sequence of terms matches a signature if and only if it is a super-sequence of at least one of the sequence of signature terms in the signature library. A regular expression for two sequences of signature terms can be constructed by first constructing the regular expressions for each signature term sequence and then using the alternation or set union operator (denoted by "|") to combine them. A regular expression containing the alternation operator matches a sequence if the sequence matches either the regular expression before the operator or the regular expression after the operator. For example, two individual regular expressions are extracted from multiple payloads, namely the aforementioned Payload-1 and Payload-3 as below:
$r_1 = (.*)$ MAIL $(.*)$ RCPT
$r_2 = (.*)$ RCPT $(*)$ MAIL Assuming the Payload-1 and Payload-3 belongs to two flows in a cohesive flow-set, combined signature can be generated for the main network application of the flow-set from these two regular expressions as below:
$S_2 = (.*)$ MAIL $(.*)$ RCPT I $(*)$ RCPT $(.*)$ MAIL The NFA for the combined signature can be formed by generating the NFA for individual sequences and combining their start states. FIG. 3b and FIG. 3c show the NFA for $r_1$ and $r_2$, respectively. FIG. 3d shows the NFA for the signature $S_2$. Note that the NFA in FIG. 3d now has multiple accepting states. During classification, a match is found as soon as any one of the accepting states is added to the set of active states.

Figure 3E:
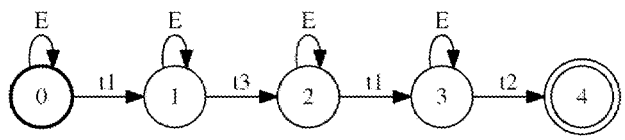

An algorithm for constructing a NFA from a flow-set is described below. First, a method to represent a single flow as a regular expression of signature terms and to construct an NFA from these signature terms is described. A single flow is analyzed first to search for all occurrences of all signature terms. The signature terms that are found in the flow are placed in a sequence according to the order of occurrence in the flow. This sequence of signature terms is converted to a regular expression by preceding each signature term with a wildcard substring $(.*)$. For example, a sequence $<t_1, t_3, t_1, t_2>$ found in a payload is converted to a regular expression $(.*) t_1(.*) t_3(.*) t_1(.*) t_2$. Consider that the number of signature terms in the regular expression is m, which may include repeated signature terms. An equivalent NFA can be created to represent this regular expression by creating a linear sequence of m+1 states. Each of the states except the last one in the linear sequence has a self loop labeled "E"'. The last state is an accepting state. The NFA corresponding to the regular expression $(.*) t_1(.*) t_3(.*) t_1(.*) t_2$ is shown in FIG. 3e.

A NFA for all the flows in a flow-set can be constructed by creating a NFA for each flow and then performing a standard union operation over the NFAs. Since all the NFAs that are constructed have similar linear structures with self loops "E" on all internal states, this construction can be used that allows generating a single NFA directly. This NFA shares the states whenever two regular expressions have common prefix. The idea is to have a single NFA at any given time for all flows in a flow-set.

Figure 3F:
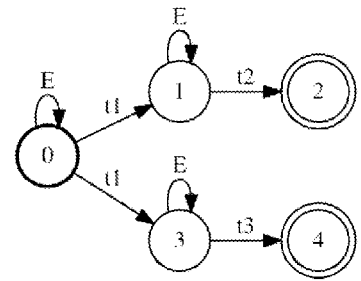
Figure 3G:
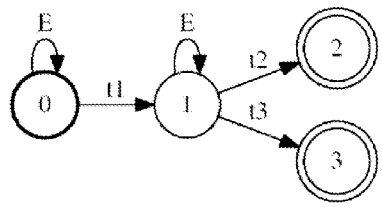
Figure 3I:
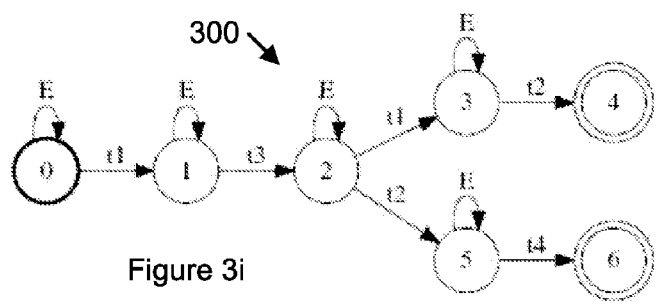

The NFA can be optimized by sharing the states whenever two regular expressions have common prefix. This reduces the number of states in the NFA but does not introduce any new paths in the NFA. This ensures that the matching semantics of the optimized NFA is same as the original NFA. FIG. 3f shows the original NFA generated from the sequences <$t_1$, $t_2$> and <$t_2$, $t_3$>. FIG. 3g shows the optimized NFA with one fewer state than the NFA shown in FIG. 3f. The savings can be significant when generating a signature from large number of flow payloads.

An example algorithm to construct the NFA is shown in TABLE 4 below. The inputs to the algorithm are all the flows in a flow-set (i.e., the set of training flows F) and the set of signature terms (referred to as eligible terms) for the flow-set. First, for every flow in the flow-set, the eligible terms are sorted in the order of occurrence in the payload (line 12). The algorithm iterates through each of these eligible terms in the order of occurrence in the flow payload and builds the state machine starting from state 0 every time (line 10). If the transitions (i.e. the terms) are already part of the state machine, then the pointer to the current state is just forwarded (lines 15). However, if the transition and state do not exist, then they are added to the existing state machine (lines 17-20). If the term that is being examined is the last one in the sorted sequence in the flow payload, then the next state is made into an accepting state (line 22); otherwise a self loop "E" is added as the next state. Finally, after iterating through all the flow content streams from the training flow-set, the final state machine is returned (line 30).

TABLE 4

```
1:   Parameters: F /* Set of training flows */
2:   Parameters: E /* Set of eligible terms */
3:   state_label = 0;
4:   current_state = create_new_state(state_label);
5:   state_label + +;
6:   accepting_states = { };
7:   state_list = {current_state};
8:   state_machine = { };
9:   for f ∈ F do
10:      current_state = 0;
11:      /* Sort terms in terms of the increasing order of the index of the
              term in the flow */
12:      T = sortTerms(f, E);
13:      for t ∈ T do
14:         if hasTransition(current_state, t) then
15:            next_state = get_next_state(current_state, t)
16:         else
17:            next_state = create_new_state(state_label);
18:            state_label + +;
19:            state_list = state_list ∪ {next_state}
20:            state_machine = state_machine ∪ {[current_state, t] →
                  next_state};
21:            if isLastTermInSequence(t) then
22:               accepting_states = accepting_states ∪ {next_state}
23:            else
24:               state_machine = state_machine ∪ {[next_state, Σ] →
                     next_state};
25:            end if
26:         end if
27:         current_state = next_state;
28:      end for
29:   end for
30:   return state_machine;
```

Figure 3J:
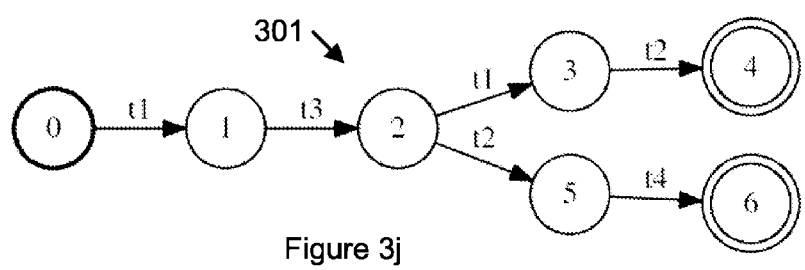
Figure 3K:
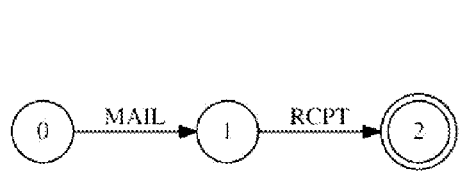
Figure 3M:
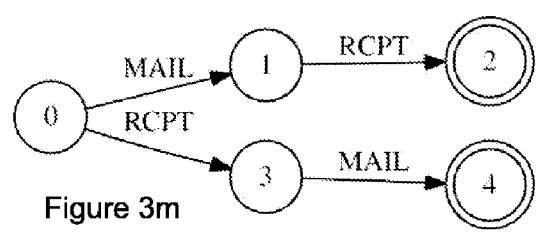
Figure 3N:
Figure 3P:
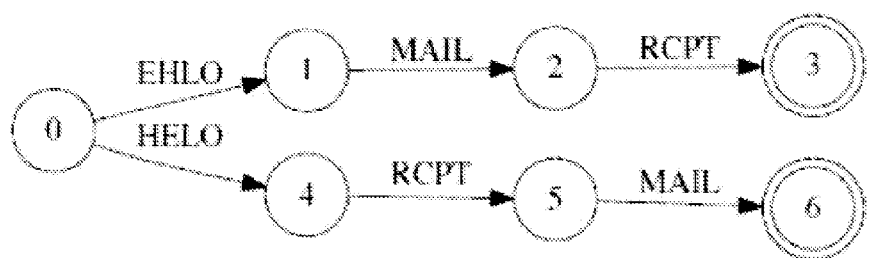

FIGS. 3i and 3j show an example of using network application/protocol signatures by constructing a modified term transition state machine (MTTSM) and scanning a signature term sequence to match the MTTSM according to aspects of the invention.

The NFA (300) depicted in FIG. 3i includes states 0 through 6 with state 0 being the starting state and states 4 and 6 being the accepting states. Each of the states is coupled to one or more state transitions each annotated with (or assigned) an associated signature term (i.e., one of $t_1$ through $t_4$), when found while sequentially scanning a string (e.g., a signature term sequence or a regular expression) with the state being active causes the associated state transition in the NFA. For example, while state 0 is the active state, finding the signature term $t_1$ in a flow under classification causes the state transition to occur leading to state 1 becoming active. In another example, while state 2 is the active state, finding the signature term $t_1$ in a flow under classification causes the state transition to occur leading to state 3 becoming active and finding the signature term $t_2$ in a flow under classification causes the state transition to occur leading to state 5 becoming active. The self loops annotated with "E" represent scanning wildcard substrings in the flow under classification. The classification procedure for classifying any flow using the NFA (300) is essentially the same as described with respect to the example NFA depicted in FIG. 3b above.

As described abode, the NFA (300) can be converted to the MTTSM (301) depicted in FIG. 3j by eliminating the self loops. In the MTTSM (301) depicted in FIG. 3j, the classification procedure of NFA (300) is modified so that only one active state is maintained at any moment. Also, a different approach may be used for matching MTTSM to signature terms in the flow to be classified. First, the sequence of signature terms is extracted from the flow to be classified and indexed based on the order of occurrence of each signature term. Specifically, each signature term in the sequence is assigned an index based on its position in the sequence. For example, the first signature term in the sequence may be assigned an index "1", the second signature term in the sequence may be assigned an index "2", etc. If a particular signature term occurs multiple times in the sequence, the signature term is assigned one index for each of the positions. Further, a dummy position (or a dummy term) before the first signature term in the sequence may be assigned an index "0". Matching starts from the start state 0 in the MTTSM (301) being the active state and by maintaining a pointer to the current signature term being examined in the sequence. This signature term pointed to by the pointer is referred to as in the current pointer position, which, is initially set to the dummy position before the first signature term in the sequence. Each state in the MTTSM (301) has a list of outgoing state transitions. When a particular state is the active state, the sequence of signature terms is examined subsequent to the current pointer position to match the signature term annotating the outgoing state transition from the active state. If the signature term annotating the outgoing state transition matches any signature term in the sequence subsequent to the current pointer position, the current pointer is advanced to point to a new position where the matched signature term is in the sequence and the next state of the active state's outgoing state transition becomes the new active state. If there are multiple matches, the signature term in a position with the lowest index (i.e., the earliest occurrence in the sequence) is chosen. If such signature term is not found, the flow to be classified is said to be not matched to the MTTSM and the search stops. Otherwise this search continues until an accepting state becomes the new active state, then a classification is found and the search stops.

An example MTTSM classification scheme using the example MTTSM (301) depicted in FIG. 3j and the signature term sequence <$t_3$, $t_1$, $t_3$, $t_2$, $t_1$, $t_2$, $t_4$> extracted from a flow being classified is described below. As described above, the signature term $t_3$ is assigned the indexes 1 and 3 corresponding to its occurrences in the first and third positions in the sequence, the signature term $t_1$ is assigned the indexes 2 and 5 corresponding to its occurrences in the second and fifth positions in the sequence, the signature term $t_2$ is assigned the indexes 4 and 6 corresponding to its occurrences in the fourth and sixth positions in the sequence, and the signature term $L_i$ is assigned the index 7 corresponding to its occurrences in the seventh position in the sequence. Initially, the active state is state 0, and current pointer is set pointing to a dummy position of the sequence before the first term $t_3$. When in state 0, only one outgoing state transition exists annotated with the signature term $t_1$. A MTTSM based classifier (e.g., classifier (103) of FIG. 1) searches through the sequence of signature terms subsequent to the current pointer position to the end of the sequence to see if it finds the signature term $t_1$. In this case, the signature term $t_1$ occurs as the second term (i.e., the index 2 position) in the sequence. The MTTSM based classifier moves the current pointer to the index 2 position where the second signature term $t_1$ is in the sequence, and makes state 1 active. Note that the first term $t_3$ is skipped and not considered, which is in contrast to NFA based matching.

In state 1, the MTTSM based classifier moves the current pointer to the index 3 position where the third signature term $t_3$ is in the sequence, and makes state 2 the only active state, again in contrast to NFA based matching. As noted above, eliminating self loops may cause certain flows to be not classified (i.e., false negative) due to a partial match found when traversing along one branch of the last active state preventing a potential complete match being found if another branch of the last active state is allowed to be traversed. However, in the system (100) described above, flows not classified due to false negative are returned to the signature generation process to generate another signature that can be used to detect another flow containing the signature term sequence previously escaped the classification.

In state 2, the MTTSM based classifier looks at all the signature terms in the sequence subsequent to the current pointer position (i.e., it looks at $t_2$, $t_1$, $t_2$, and $t_4$) and determines that match(es) exist for both $t_1$-annotated outgoing state transition and $t_2$-annotated outgoing state transition to the signature terms subsequent to the current pointer position. However, because the matched $t_2$. is in a smaller index position 4 than the index position 5 of the matched $t_1$, the MTTSM based classifier considers the $t_2$-annotated outgoing state transition as the chosen match and moves current pointer to point to the index 4 position where the fourth signature term $t_2$ is in the sequence, and makes state 5 the only active state.

In state 5, the MTTSM based classifier considers the only outgoing state transition annotated with the signature term $t_4$ as matching to the signature terms subsequent to the current pointer position, moves current pointer to point to the index 7 position where the last signature term $t_4$ is in the sequence, and makes state 6 the only active state.

Since state 6 is an accepting state, the matching is complete and the classification is done. That is, the signature term sequence <$t_3$, $t_1$, $t_3$, $t_2$, $t_1$, $t_2$, $t_4$> is matched to the MTTSM (301) and the signature represented by the MTTSM (301). Accordingly, the flow is classified as associated with the network application having the signature represented by the MTTSM (301).

As described above, the MTTSM based classifier does not introduce or remove any states from the corresponding NFA, but just adding a constraint in terms of when a state transition is or is not to be considered. Therefore, the set of flows that can be classified by the MTTSM based classifier is a subset of the set of term sequences that can be classified by using the corresponding NFA. For example, the MTTSM based classifier may not classify certain flows (e.g., due to skipping the first term $t_3$ in the aforementioned signature term sequence) using MTTSM (301) that are classifiable by using the corresponding NFA (300). In contrast, any flow that is not classified using the NFA (300) will also not be classified using the MTTSM (301). As discussed with respect to the system (100) of FIG. 1 above, this is acceptable as any flow that is not classified will be fed back to the signature generation process.

Although specific formats or structures are used as examples in the foregoing description regarding the flows, the captured payloads, the signature terms, the NFA, the MTTSM, etc., one skilled in the art, with the benefit of this disclosure, will recognize that other formats or structures may also be used in the system and methods described without deviating from the spirit of the invention.

Figure 4:
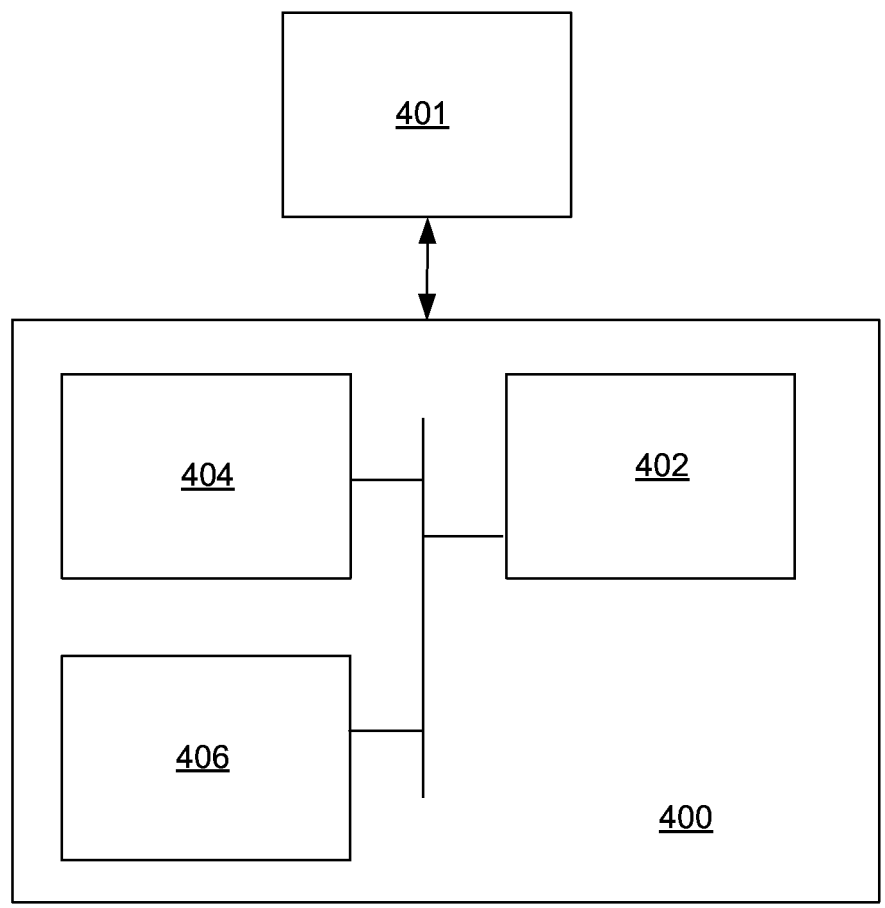
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:

identifying, using a processor of a computer system and based on a first pre-determined criterion, a training set from a plurality of flows obtained from the network traffic, wherein the training set is associated with a network application and comprises a plurality of captured payloads corresponding to the plurality of flows;

determining, using the processor and based on a first pre-determined algorithm, a set of signature terms from the training set, wherein the set of signature terms are selected from a plurality of substrings extracted from the plurality of captured payloads;

representing a portion of the plurality of captured payloads as a plurality of regular expressions, each comprising a first sequence of one or more signature terms based on the set of signature terms;

generating a modified term transition state machine (MTTSM), comprising a plurality of states coupled by a plurality of links to form a plurality of paths, by:

representing a first regular expression of the plurality of regular expressions by a first path, of the plurality of paths, comprising a first state and a second state, of the plurality of states, linked by a first link, of the plurality of links, that is assigned a first signature term in the first regular expression to represent a first state transition associated with the first signature term; and representing a second regular expression of the plurality of regular expressions by a second path, of the plurality of paths, comprising the first state and a third state, of the plurality of states, linked by a second link, of the plurality of links, that is assigned a second signature term in the second regular expression to represent a second state transition associated with the second signature term;

analyzing, using the processor and based on the MTTSM, a flow separate from the plurality of flows and associated with a server in the network, comprising:

extracting, from the flow and based on the set of signature terms, a second sequence of signature terms;

determining the first signature term and the second signature term as contained in the second sequence of signature terms;

comparing a first position and a second position of the first signature term and the second signature term, respectively, in the second sequence of signature terms to generate a comparison result; and traversing, in response to the comparison result indicating that the first position is ahead of the second position in the second sequence of signature terms, the first link to generate an analysis result; and determining, based on the analysis result, the server as executing the network application.

2. The method of claim 1, wherein the network application comprises a layer-seven application.

3. The method of claim 1, further comprising:

representing the plurality of regular expressions as a non-deterministic finite automaton (NFA) comprising:

the plurality of states coupled by the plurality of links; and self loop transition from a state of the plurality of states back to the state itself, wherein generating the MTTSM further comprises converting the NFA to the MTTSM by eliminating the self loop transition.

4. The method of claim 1, wherein analyzing the flow based on the MTTSM further comprises:

identifying the first state as a first active state in the MTTSM for analyzing a first consecutive portion of the second sequence of signature terms starting from a third position therein;

wherein the first position and a second position are compared in response to determining that the first consecutive portion comprises the first position and the second position, and wherein traversing the first link comprises:

identifying, within the first consecutive portion, a second consecutive portion of the second sequence of signature terms starting from a position immediately subsequent to the first position; and identifying the second state as a second active state in the MTTSM for analyzing the second consecutive portion.

5. The method of claim 4, wherein traversing the first link further comprises:

determining a match between the flow and the MTTSM in response to determining the second state as being end of the first path, wherein the server is determined as executing the network application based on the match.

6. The method of claim 5, further comprising:

determining, based on a pre-determined formula, a match confidence score of the match using at least one selected from a group consisting of a state machine confidence score of the MTTSM and a path confidence score of the first path; and performing, in response to the match confidence score meeting a second pre-determined criterion, a pre-determined action comprising at least one selected from a group consisting of bypassing determining the server as executing the network application, re-generating the MTTSM by including the flow in the training set, generating a security alert, and determining the server as executing a wrapped network application.

7. The method of claim 6, further comprising at least one selected from a group consisting of:

determining the state machine confidence score of the MTTSM based on a first number of servers associated with the training set and a second number of flows associated with the training set; and determining the path confidence score of the first path based on at least one selected from a group consisting of a term frequency inverse document frequency associated with the first path, term transition probabilities of the first path, and a length of the first path.

8. The method of claim 1, further comprising:

wherein the MTTSM is generated during a training phase to represent the plurality of regular expressions, wherein the plurality of flows are obtained from the network traffic during the training phase, wherein the set of signature terms are compiled during the training phase, wherein at least a portion of the flow is obtained subsequent to the training phase, wherein analyzing the flow comprises analyzing the portion of the flow based on the MTTSM to determine, prior to the flow being completed by the server, the server as executing the network application, and wherein the server is not determined, prior to obtaining the portion of the flow, as executing the network application.

9. The method of claim 1, further comprising at least one selected from a group consisting of:
- removing a first disqualified signature term from the set of signature terms in response to determining that the first disqualified signature term has a length less than a first pre-determined threshold;
- splitting a second disqualified signature term in the set of signature terms in response to determining that the second disqualified signature term comprises a pre-determined control character;
- removing a third disqualified signature term from the set of signature terms in response to determining that the third disqualified signature term identifies at least one selected from a group consisting of a day of a week, a month, a year, and a world-wide-web domain; and
- removing a fourth disqualified signature term from the set of signature terms in response to determining that the fourth disqualified signature term contains less than two alphabetic characters.

10. The method of claim 1, further comprising:
- identifying a redundancy in the first path and the second path; and
- converting the MTTSM from a trie-like automaton to a directed-acylic-graph-like automaton by merging the redundancy in the first path and the second path.

11. The method of claim 1, further comprising:
- generating another MTTSM comprising another plurality of paths based on another set of signature terms determined from another training set associated with another network application;
- identifying, based on a third pre-determined criterion and in response to determining that the set of signature terms and the another set of signature terms share a non-zero joint set, a state machine relationship between the MTTSM and the another MTTSM by at least comparing the first path in the MTTSM and a third path of the another plurality of paths in the another MTTSM; and
- modifying the MTTSM and the another MYYSM based on the state machine relationship.

12. The method of claim 11, wherein identifying the state machine relationship between the MTTSM and the another MTTSM comprises:
- comparing, based on a fourth pre-determined criterion and in response to determining that the set of signature terms and the another set of signature terms share a non-zero joint set, the first path and the third path to determine a path relationship comprising at least one selected from a group consisting of a weak path match, a strong path match, and a no path match, wherein the state machine relationship between the MTTSM and the another MTTSM is identified based on at least the path relationship and comprises at least one selected from a group consisting of a weak sub state machine match (WSSMM), a strong sub state machine match (SSSMM), an equivalent state machine match (ESMM), and a Strong Partial State Machine Match (SPSMM),
- wherein modifying the MTTSM and the another MYYSM comprises:
  - merging the MTTSM and the another MYYSM in response to identifying the state machine relationship is the ESMM; and
  - generating a new MTSSM based on the non-zero joint set while eliminating the non-zero joint set from the MTTSM and the another MTTSM in response to identifying the state machine relationship is at least one selected from a group consisting of the SSSMM and the SPSMM.

13. A system for profiling network traffic of a network, comprising:
- a data collector configured to obtain, from the network traffic, a plurality of flows;
- a statistical analyzer configured to identify, from the plurality of flows, a training set comprising a plurality of captured payloads corresponding to the plurality of flows;
- a profiler configured to identify the training set as associated with a network application;
- a signature generator configured to:
  - determine, based on a first pre-determined algorithm, a set of signature terms from the training set, wherein the set of signature terms are selected from a plurality of substrings extracted from the plurality of captured payloads;
  - generate a modified term transition state machine (MTTSM), comprising a plurality of states coupled by a plurality of links to form a plurality of paths, by:
    - representing a first regular expression of the plurality of regular expressions by a first path, of the plurality of paths, comprising a first state and a second state, of the plurality of states, linked by a first link, of the plurality of links, that is assigned a first signature term in the first regular expression to represent a first state transition associated with the first signature term; and
    - representing a second regular expression of the plurality of regular expressions by a second path, of the plurality of paths, comprising the first state and a third state, of the plurality of states, linked by a second link, of the plurality of links, that is assigned a second signature term in the second regular expression to represent a second state transition associated with the second signature term;
- a processor and memory storing instructions when executed by the processor comprising functionalities to:
  - analyze, based on the MTTSM, a flow separate from the plurality of flows and associated with a server in the network, comprising:
    - extracting, from the flow and based on the set of signature terms, a second sequence of signature terms;
    - determining the first signature term and the second signature term as contained in the second sequence of signature terms;
    - comparing a first position and a second position of the first signature term and the second signature term, respectively, in the second sequence of signature terms to generate a comparison result; and
    - traversing, in response to the comparison result indicating that the first position is ahead of the second position in the second sequence of signature terms, the first link to generate an analysis result; and
  - determine, based on the analysis result, the server as executing the network application; and
- a repository configured to store the set of signature terms and the MTTSM.

14. The system of claim 13, wherein the network application comprises a layer-seven application.

15. The system of claim 13, the signature generator further configured to:
- represent the plurality of regular expressions as a nondeterministic finite automaton (NFA) comprising:
  - the plurality of states coupled by the plurality of links; and self loop transition from a state of the plurality of states back to the state itself,
wherein generating the MTTSM further comprises converting the NFA to the MTTSM by eliminating the self loop transition.

16. The system of claim 13, wherein analyzing the flow based on the MTTSM further comprises:
identifying the first state as a first active state in the MTTSM for analyzing a first consecutive portion of the second sequence of signature terms starting from a third position therein;
wherein the first position and a second position are compared in response to determining that the first consecutive portion comprises the first position and the second position, and
wherein traversing the first link comprises:
identifying, within the first consecutive portion, a second consecutive portion of the second sequence of signature terms starting from a position immediately subsequent to the first position; and
identifying the second state as a second active state in the MTTSM for analyzing the second consecutive portion.

17. The system of claim 16, wherein traversing the first link further comprises:
determining a match between the flow and the MTTSM in response to determining the second state as being end of the first path,
wherein the server is determined as executing the network application based on the match.

18. The system of claim 17, the instructions when executed by the processor further comprising functionalities to:
determine, based on a pre-determined formula, a match confidence score of the match using at least one selected from a group consisting of a state machine confidence score of the MTTSM and a path confidence score of the first path; and
perform, in response to the match confidence score meeting a second pre-determined criterion, a pre-determined action comprising at least one selected from a group consisting of bypassing determining the server as executing the network application, re-generating the MTTSM by including the flow in the training set, generating a security alert, and determining the server as executing a wrapped network application.

19. The system of claim 18, further comprising a distiller module configured to perform at least one selected from a group consisting of:
determining the state machine confidence score of the MTTSM based on a first number of servers associated with the training set and a second number of flows associated with the training set; and
determining the path confidence score of the first path based on at least one selected from a group consisting of a term frequency inverse document frequency associated with the first path, term transition probabilities of the first path, and a length of the first path.

20. The system of claim 13,
wherein the MTTSM is generated during a training phase to represent the plurality of regular expressions, wherein the plurality of flows are obtained from the network traffic during the training phase, wherein the set of signature terms are compiled during the training phase,
wherein at least a portion of the flow is obtained subsequent to the training phase,
wherein analyzing the flow comprises analyzing the portion of the flow based on the MTTSM to determine, prior to the flow being completed by the server, the server as executing the network application, and
wherein the server is not determined, prior to obtaining the portion of the flow, as executing the network application.

21. The system of claim 13, the signature generator further configured to perform at least one selected from a group consisting of:
removing a first disqualified signature term from the set of signature terms in response to determining that the first disqualified signature term has a length less than a first pre-determined threshold;
splitting a second disqualified signature term in the set of signature terms in response to determining that the second disqualified signature term comprises a pre-determined control character;
removing a third disqualified signature term from the set of signature terms in response to determining that the third disqualified signature term identifies at least one selected from a group consisting of a day of a week, a month, a year, and a world-wide-web domain; and
removing a fourth disqualified signature term from the set of signature terms in response to determining that the fourth disqualified signature term contains less than two alphabetic characters.

22. The system of claim 13, further comprising a distiller module configured to:
identify a redundancy in the first path and the second path; and
convert the MTTSM from a trie-like automaton to a directed-acylic-graph-like automaton by merging the redundancy in the first path and the second path.

23. The system of claim 13,
the signature generator further configured to generate another MTTSM comprising another plurality of paths based on another set of signature terms determined from another training set associated with another network application, and
the system further comprising a distiller module configured to identify, based on a third pre-determined criterion and in response to determining that the set of signature terms and the another set of signature terms share a non-zero joint set, a state machine relationship between the MTTSM and the another MTTSM by at least comparing the first path in the MTTSM and a third path of the another plurality of paths in the another MTTSM; and
modify the MTTSM and the another MYYSM based on the state machine relationship.

24. The system of claim 23, wherein identifying the state machine relationship between the MTTSM and the another MTTSM comprises:
comparing, based on a fourth pre-determined criterion and in response to determining that the set of signature terms and the another set of signature terms share a non-zero joint set, the first path and the third path to determine a path relationship comprising at least one selected from a group consisting of a weak path match, a strong path match, and a no path match,
wherein the state machine relationship between the MTTSM and the another MTTSM is identified based on at least the path relationship and comprises at least one selected from a group consisting of a weak sub state machine match (WSSMM), a strong sub state machine match (SSSMM), an equivalent state machine match (ESMM), and a Strong Partial State Machine Match (SPSMM), wherein modifying the MTTSM and the another MTTSM comprises:
   merging the MTTSM and the another MTTSM in response to identifying the state machine relationship is the ESMM; and
   generating a new MTTSM based on the non-zero joint set while eliminating the non-zero joint set from the MTTSM and the another MTTSM in response to identifying the state machine relationship is at least one selected from a group consisting of the SSSMM and the SPSMM.

25. A non-transitory computer readable medium embodying instructions for profiling network traffic of a network, the instructions when executed by a processor comprising functionality for:
   identifying, based on a first pre-determined criterion, a training set from a plurality of flows obtained from the network traffic, wherein the training set is associated with a network application and comprises a plurality of captured payloads corresponding to the plurality of flows;
   determining, based on a first pre-determined algorithm, a set of signature terms from the training set, wherein the set of signature terms are selected from a plurality of substrings extracted from the plurality of captured payloads;
   representing a portion of the plurality of captured payloads as a plurality of regular expressions, each comprising a first sequence of one or more signature terms based on the set of signature terms;
   generating a modified term transition state machine (MTTSM), comprising a plurality of states coupled by a plurality of links to form a plurality of paths, by:
      representing a first regular expression of the plurality of regular expressions by a first path, of the plurality of paths, comprising a first state and a second state, of the plurality of states, linked by a first link, of the plurality of links, that is assigned a first signature term in the first regular expression to represent a first state transition associated with the first signature term; and
      representing a second regular expression of the plurality of regular expressions by a second path, of the plurality of paths, comprising the first state and a third state, of the plurality of states, linked by a second link, of the plurality of links, that is assigned a second signature term in the second regular expression to represent a second state transition associated with the second signature term;
   analyzing, based on the MTTSM, a flow separate from the plurality of flows and associated with a server in the network, comprising:
      extracting, from the flow and based on the set of signature terms, a second sequence of signature terms;
      determining the first signature term and the second signature term as contained in the second sequence of signature terms;
      comparing a first position and a second position of the first signature term and the second signature term, respectively, in the second sequence of signature terms to generate a comparison result; and
      traversing, in response to the comparison result indicating that the first position is ahead of the second position in the second sequence of signature terms, the first link to generate an analysis result; and
   determining, based on the analysis result, the server as executing the network application.

26. The non-transitory computer readable medium of claim 25, wherein the network application comprises a layer-seven application.

27. The non-transitory computer readable medium of claim 25, the instructions when executed by the processor further comprising functionality for:
   representing the plurality of regular expressions as a non-deterministic finite automaton (NFA) comprising:
      the plurality of states coupled by the plurality of links; and
      self loop transition from a state of the plurality of states back to the state itself,
   wherein generating the MTTSM further comprises converting the NFA to the MTTSM by eliminating the self loop transition.

28. The non-transitory computer readable medium of claim 25, wherein analyzing the flow based on the MTTSM further comprises:
   identifying the first state as a first active state in the MTTSM for analyzing a first consecutive portion of the second sequence of signature terms starting from a third position therein;
   wherein the first position and a second position are compared in response to determining that the first consecutive portion comprises the first position and the second position, and
   wherein traversing the first link comprises:
      identifying, within the first consecutive portion, a second consecutive portion of the second sequence of signature terms starting from a position immediately subsequent to the first position; and
      identifying the second state as a second active state in the MTTSM for analyzing the second consecutive portion.

29. The non-transitory computer readable medium of claim 28, wherein traversing the first link further comprises:
   determining a match between the flow and the MTTSM in response to determining the second state as being end of the first path,
   wherein the server is determined as executing the network application based on the match.

30. The non-transitory computer readable medium of claim 29, the instructions when executed by the processor further comprising functionality for:
   determining, based on a pre-determined formula, a match confidence score of the match using at least one selected from a group consisting of a state machine confidence score of the MTTSM and a path confidence score of the first path; and
   performing, in response to the match confidence score meeting a second pre-determined criterion, a pre-determined action comprising at least one selected from a group consisting of bypassing determining the server as executing the network application, re-generating the MTTSM by including the flow in the training set, generating a security alert, and determining the server as executing a wrapped network application.

31. The non-transitory computer readable medium of claim 30, the instructions when executed by the processor further comprising functionality for at least one selected from a group consisting of:
   determining the state machine confidence score of the MTTSM based on a first number of servers associated with the training set and a second number of flows associated with the training set; and
   determining the path confidence score of the first path based on at least one selected from a group consisting of a term frequency inverse document frequency associated with the first path, term transition probabilities of the first path, and a length of the first path.

32. The non-transitory computer readable medium of claim 25, the instructions when executed by the processor further comprising functionality for:
    wherein the MTTSM is generated during a training phase to represent the plurality of regular expressions, wherein the plurality of flows are obtained from the network traffic during the training phase, wherein the set of signature terms are compiled during the training phase,
    wherein at least a portion of the flow is obtained subsequent to the training phase,
    wherein analyzing the flow comprises analyzing the portion of the flow based on the MTTSM to determine, prior to the flow being completed by the server, the server as executing the network application, and
    wherein the server is not determined, prior to obtaining the portion of the flow, as executing the network application.

33. The non-transitory computer readable medium of claim 25, the instructions when executed by the processor further comprising functionality for at least one selected from a group consisting of:
    removing a first disqualified signature term from the set of signature terms in response to determining that the first disqualified signature term has a length less than a first pre-determined threshold;
    splitting a second disqualified signature term in the set of signature terms in response to determining that the second disqualified signature term comprises a pre-determined control character;
    removing a third disqualified signature term from the set of signature terms in response to determining that the third disqualified signature term identifies at least one selected from a group consisting of a day of a week, a month, a year, and a world-wide-web domain; and
    removing a fourth disqualified signature term from the set of signature terms in response to determining that the fourth disqualified signature term contains less than two alphabetic characters.

34. The non-transitory computer readable medium of claim 25, the instructions when executed by the processor further comprising functionality for:
    identifying a redundancy in the first path and the second path; and
    converting the MTTSM from a trie-like automaton to a directed-acylic-graph-like automaton by merging the redundancy in the first path and the second path.

35. The non-transitory computer readable medium of claim 25, the instructions when executed by the processor further comprising functionality for:
    generating another MTTSM comprising another plurality of paths based on another set of signature terms determined from another training set associated with another network application;
    identifying, based on a third pre-determined criterion and in response to determining that the set of signature terms and the another set of signature terms share a non-zero joint set, a state machine relationship between the MTTSM and the another MTTSM by at least comparing the first path in the MTTSM and a third path of the another plurality of paths in the another MTTSM; and
    modifying the MTTSM and the another MYYSM based on the state machine relationship.

36. The non-transitory computer readable medium of claim 35, wherein identifying the state machine relationship between the MTTSM and the another MTTSM comprises:
    comparing, based on a fourth pre-determined criterion and in response to determining that the set of signature terms and the another set of signature terms share a non-zero joint set, the first path and the third to determine a path relationship comprising at least one selected from a group consisting of a weak path match, a strong path match, and a no path match,
    wherein the state machine relationship between the MTTSM and the another MTTSM is identified based on at least the path relationship and comprises at least one selected from a group consisting of a weak sub state machine match (WSSMM), a strong sub state machine match (SSSMM), an equivalent state machine match (ESMM), and a Strong Partial State Machine Match (SPSMM),
    wherein modifying the MTTSM and the another MTTSM comprises:
        merging the MTTSM and the another MTTSM in response to identifying the state machine relationship is the ESMM; and
    generating a new MTSSM based on the non-zero joint set while eliminating the non-zero joint set from the MTTSM and the another MTTSM in response to identifying the state machine relationship is at least one selected from a group consisting of the SSSMM and the SPSMM.

* * * * *